(12) United States Patent
Hutkins et al.

(10) Patent No.: US 11,768,728 B2
(45) Date of Patent: Sep. 26, 2023

(54) ROUTING MULTIPLE DIAGNOSTIC PATHWAYS

(71) Applicant: NIO Technology (Anhui) Co., Ltd., Hefei (CN)

(72) Inventors: Peter Hutkins, Scotts Valley, CA (US); Nahum Vladimir Castillo Felix, Cupertino, CA (US); Sophia Quan, San Jose, CA (US)

(73) Assignee: NIO Technology (Anhui) Co., Ltd., Hefei (CN)

( * ) Notice: Subject to any disclaimer, the term of this patent is extended or adjusted under 35 U.S.C. 154(b) by 0 days.

(21) Appl. No.: 17/553,324

(22) Filed: Dec. 16, 2021

(65) Prior Publication Data
US 2023/0195555 A1 Jun. 22, 2023

(51) Int. Cl.
*G06F 11/07* (2006.01)
*G06F 11/30* (2006.01)
*H04L 41/0654* (2022.01)
*H04L 45/74* (2022.01)

(52) U.S. Cl.
CPC ........ *G06F 11/0784* (2013.01); *G06F 11/079* (2013.01); *G06F 11/0769* (2013.01); *G06F 11/0793* (2013.01); *G06F 11/3027* (2013.01); *H04L 41/0654* (2013.01); *H04L 45/74* (2013.01)

(58) Field of Classification Search
CPC ............. G06F 11/0784; G06F 11/0769; G06F 11/079; G06F 11/0793; G06F 11/3027; H04L 41/0654
See application file for complete search history.

(56) References Cited

U.S. PATENT DOCUMENTS

| 8,930,064 B2 | 1/2015 | Merg et al. |
| 9,202,319 B2 | 12/2015 | Chinnadurai et al. |
| 10,594,587 B2 * | 3/2020 | Kim .................... H04L 41/0677 |
| 10,749,738 B2 * | 8/2020 | Kim .................... H04L 41/0677 |
| 10,796,502 B2 | 10/2020 | Rockwell et al. |
| 2014/0068099 A1 | 3/2014 | Komori |

(Continued)

FOREIGN PATENT DOCUMENTS

KR 2021-0066554 6/2021

OTHER PUBLICATIONS

Extended European Search Report for European Patent Application No. 22213470.2, dated Apr. 19, 2023 7 pages.

*Primary Examiner* — Nadeem Iqbal
(74) *Attorney, Agent, or Firm* — Sheridan Ross, PC

(57) ABSTRACT

An apparatus, system, and method are provided for routing multiple diagnostic pathways. A protocol data unit (PDU) router may receive a diagnostic response. The PDU router may identify a diagnostic request corresponding to the diagnostic response, based on a comparison of a first PDU identifier associated with the diagnostic request and a second PDU identifier associated with the diagnostic response. The identify a routing path between the diagnostic target and a diagnostic client associated with the diagnostic request, based on the first PDU identifier and the second PDU identifier. The PDU router may route the diagnostic response to the diagnostic client, based on the routing path. The routing path may overlap at least a portion of a second routing path between the diagnostic target and a second diagnostic client.

20 Claims, 6 Drawing Sheets

(56) References Cited

U.S. PATENT DOCUMENTS

| | | |
|---|---|---|
| 2017/0078400 A1 | 3/2017 | Binder et al. |
| 2017/0207962 A1 | 7/2017 | Purushothaman et al. |
| 2020/0382597 A1 | 12/2020 | Jung |
| 2020/0389469 A1 | 12/2020 | Litichever et al. |

* cited by examiner

ROUTING MULTIPLE DIAGNOSTIC PATHWAYS

FIELD

The present disclosure is generally directed to an automotive electronics system, in particular, toward vehicle diagnostics.

BACKGROUND

Some automotive electronics systems may include an electronic control unit (ECU) capable of controlling electrical systems or subsystems in a vehicle. In some cases, an ECU (also referred to herein as a diagnostic server) may retrieve diagnostics information associated with the vehicle by reading values from sensors of the vehicle. A diagnostic tester (also referred to herein as a diagnostic client, a diagnostic testing device, or a diagnostic testing application) may access the ECU to access and evaluate the retrieved diagnostics information using a diagnostic application.

In some vehicle diagnostic techniques, routing between diagnostic devices and an ECU is managed by preventing multiple overlapping routing paths between the diagnostic testers and the ECU. For example, in some vehicle diagnostic systems, multiple diagnostic testers are routed to the ECU through respective static routing paths that do not overlap with one another.

DETAILED DESCRIPTION

Figure 1:
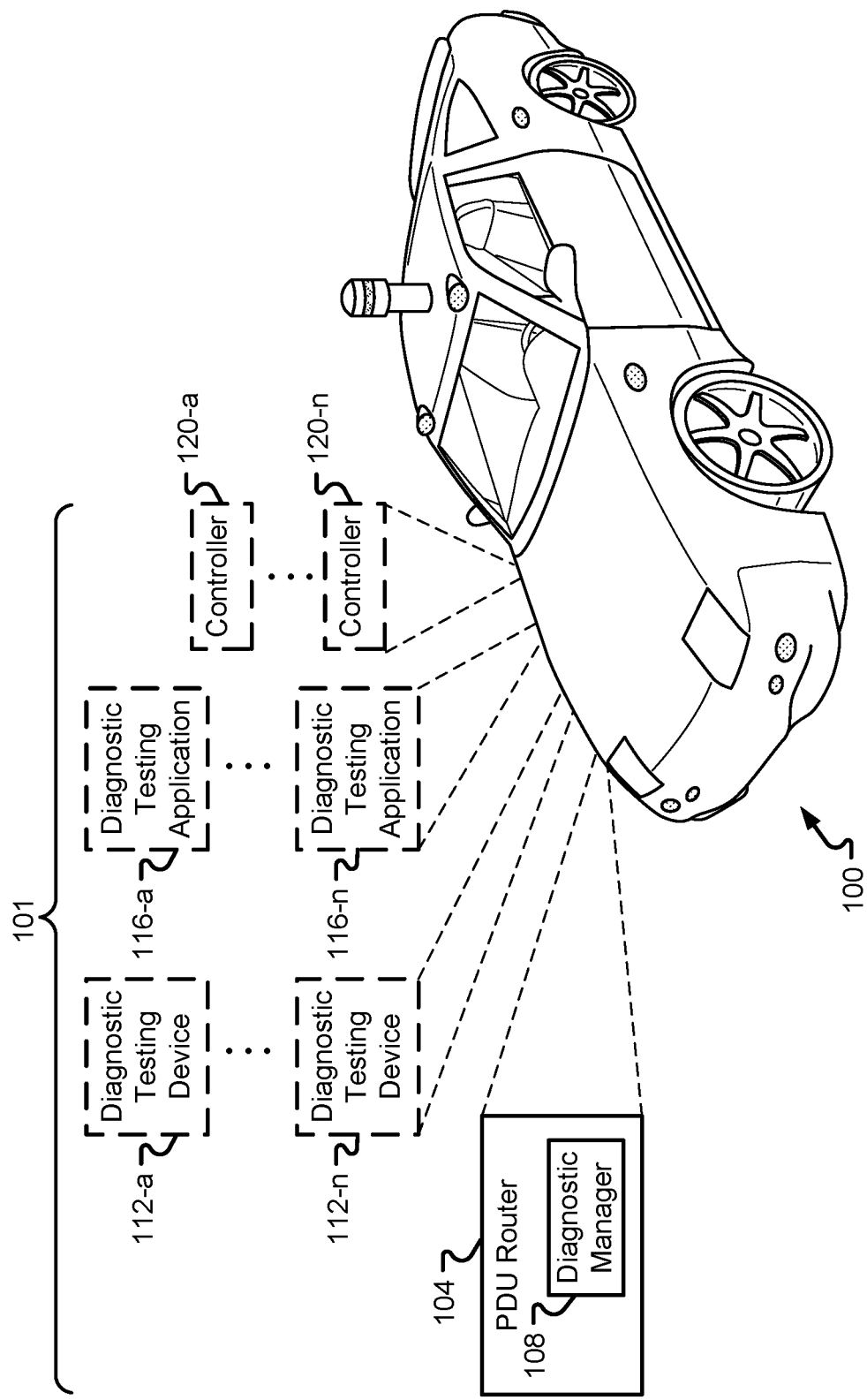
FIG. 1 illustrates an example of a system that supports routing multiple diagnostic pathways in accordance with aspects of the present disclosure.

Embodiments of the present disclosure will be described in connection with a vehicle system.

According to example aspects of the present disclosure, a vehicle system (e.g., a vehicle communications system) is described herein that may support multiple routing paths (also referred to herein as routing pathways) between diagnostic clients and diagnostic servers. A diagnostic client may be, for example, a diagnostic testing device, a diagnostic testing application, or the like. A diagnostic server may be, for example, an ECU, a controller area network (CAN) ECU, a local interconnect network (LIN) ECU, or the like.

Each routing path between a diagnostic client and a diagnostic server may include electrical interconnections between the diagnostic client and the diagnostic server. In some aspects, the routing paths may be static (e.g., fixed) routing paths. Aspects of the present disclosure may support overlaps between the multiple routing paths. For example, electrical interconnections included in a routing path may overlap electrical interconnections included in at least one other routing path.

The vehicle system may include a protocol data unit (PDU) router module capable of routing PDUs (e.g., diagnostic requests, diagnostic responses) between diagnostic clients and diagnostic servers of the vehicle system.

For example, the PDU router may include a diagnostic manager (also referred to herein as a diagnostic helper or diagnostic assistant) that includes a list of PDU identifiers for matching diagnostic requests with diagnostic responses. In an example, the list may be a pre-generated list of PDU identifiers. In some aspects, when routing a diagnostic response from the diagnostic server to a diagnostic client, the diagnostic manager may use the list of PDU identifiers to differentiate between multiple routing paths between diagnostic clients and a diagnostic server.

In an example, the diagnostic manager may differentiate between the multiple routing paths by tracking from where (e.g., from which diagnostic client) each diagnostic request originated. For example, the diagnostic manager may differentiate between the multiple routing paths by remembering the latest (e.g., most recent) diagnostic request to a diagnostic server. In an example, the diagnostic manager may remember (e.g., maintain in a memory) a PDU identifier associated with the latest diagnostic request. Accordingly, for example, the diagnostic manager may remember the routing path between the diagnostic server and a diagnostic client that provided the latest diagnostic request.

When the PDU router receives a diagnostic response from the diagnostic server, the diagnostic manager may match the diagnostic response to the latest diagnostic request, based on a PDU identifier associated with the diagnostic response and the PDU identifier associated with the latest diagnostic request. Accordingly, for example, the PDU router (e.g., using the diagnostic manager and the list of PDU identifiers) may route the diagnostic response to the diagnostic client that provided the latest diagnostic request. In an example, the PDU router may route the diagnostic response to the diagnostic client using the routing path via which the diagnostic client provided the latest diagnostic request.

Aspects of the present disclosure may support avoiding multiple simultaneous client diagnostic sessions to single server. For example, the PDU router may refrain from routing or interspersing multiple diagnostic requests (e.g., from the same diagnostic client, from different diagnostic clients, etc.) to the same diagnostic server.

In some aspects, a newer diagnostic request to a diagnostic server may take precedence (e.g., always take precedence) over a previous diagnostic request. For example, for a case in which the PDU router (and/or the diagnostic server) receives two diagnostic requests in a row, and the first diagnostic request needs a response, the PDU router (and/or the diagnostic server) may consider the two diagnostic requests as an error. Additionally, or alternatively, for a case in which the first diagnostic request does not need a response, the PDU router (and/or the diagnostic server) may consider the two diagnostic requests as not an error.

FIG. 1 shows a perspective view of a vehicle 100 in accordance with example aspects of the present disclosure. The vehicle 100 may include one or more interior components (e.g., components inside an interior space, or user space, of a vehicle 100, etc.), exterior components (e.g., components outside of the interior space, or user space, of a vehicle 100, etc.), drive systems, controls systems, structural components, etc.

Although shown in the form of a car, it should be appreciated that the vehicle 100 described herein may include any conveyance or model of a conveyance, where the conveyance was designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like.

In some embodiments, the vehicle 100 may include a number of sensors, devices, and/or systems that are capable of assisting in driving operations, e.g., autonomous or semi-autonomous control. Examples of the various sensors and systems may include, but are in no way limited to, one or more of cameras (e.g., independent, stereo, combined image, etc.), infrared (IR) sensors, radio frequency (RF) sensors, ultrasonic sensors (e.g., transducers, transceivers, etc.), RADAR sensors (e.g., object-detection sensors and/or systems), LIDAR (Light Imaging, Detection, And Ranging) systems, odometry sensors and/or devices (e.g., encoders, etc.), orientation sensors (e.g., accelerometers, gyroscopes, magnetometer, etc.), navigation sensors and systems (e.g., GPS, etc.), and other ranging, imaging, and/or object-detecting sensors. The sensors may be disposed in an interior space of the vehicle 100 and/or on an outside of the vehicle 100. In some embodiments, the sensors and systems may be disposed in one or more portions of a vehicle 100 (e.g., a frame of the vehicle 100, a body panel, a compartment, etc.

According to example aspects of the present disclosure, the vehicle 100 may include a vehicle system 101 supportive of multiple routing paths between diagnostic testing devices 112, diagnostic testing applications 116 (e.g., implemented at the diagnostic testing devices 112 or other devices (not illustrated)) and controllers 120. The routing paths may be referred to as diagnostic pathways. The vehicle system 101 may include a PDU router 104, the diagnostic testing devices 112 (e.g., diagnostic testing device 112-*a* through diagnostic testing device 112-*n*), the diagnostic testing applications 116 (e.g., diagnostic testing application 116-*a* through diagnostic testing application 116-*n*), and the controllers 120 (e.g., controller 120-*a* through controller 120-*n*).

In some aspects, a diagnostic testing device 112 (e.g., any of diagnostic testing device 112-*a* through diagnostic testing device 112-*n*) may be implemented local to the vehicle system 101. For example, the diagnostic testing device 112-*a* may be mechanically and/or electronically integrated with the vehicle system 101, connected to a local communication network of the vehicle system 101, etc. Additionally, or alternatively, a diagnostic testing device 112 (e.g., any of diagnostic testing device 112-*a* through diagnostic testing device 112-*n*) may be external to the vehicle system 101. In some cases, a diagnostic testing application 116 (e.g., any of diagnostic testing application 116-*a* through diagnostic testing application 116-*n*) may be implemented local to the vehicle system 101 or may be external to the vehicle system 101.

The PDU router 104 may support routing of PDUs between diagnostic testing devices 112 (and/or the diagnostic testing applications 116) and controllers 120. In some aspects, the PDUs may include diagnostic requests and diagnostic responses. For example, the PDU router 104 may support routing of PDUs between the diagnostic testing devices 112 (and/or the diagnostic testing applications 116) and the controllers 120, via bus specific interface modules and protocol specific modules associated with a vehicle communication stack architecture (e.g., AUTOSAR Com-Stack architecture, or the like).

For example, the PDU router 104 may route PDUs among modules such as communication interface (IF) modules (e.g., CAN IF modules, LIN IF modules, Ethernet IF modules, etc.), transport protocol (TP) modules (e.g., CAN TP modules, LIN TP modules, etc.), relay modules (e.g., CAN relay modules, etc.), etc. In some aspects, the PDU router 104 may provide a PDU level gateway for transmitting a PDU received from a bus specific interface module to another bus specific interface module. In some cases, the PDU router 104 may provide gateway functionality when routing a PDU from a controller 120 (e.g., controller 120-*a*) to another controller 120 (e.g., controller 120-*n*) over the same protocol.

In an example, the PDU router 104 may route a diagnostic request(s) from a diagnostic testing device 112-*a* to a controller 120-*a*, and the PDU router 104 may route a corresponding diagnostic response(s) from the controller 120-*a* to the diagnostic testing device 112-*a*. Additionally, or alternatively, the PDU router 104 may route a diagnostic request(s) from a diagnostic testing application 116-*a* to the controller 120-*a*, and the PDU router 104 may route a corresponding diagnostic response(s) from the controller 120-*a* to the diagnostic testing application 116-*a*. In such examples, the diagnostic testing device 112-*a* (and/or the diagnostic testing application 116-*a*) may be referred to as a diagnostic client, and the controller 120-*a* may be referred to as a diagnostic server.

In some aspects, the PDU router 104 may route a diagnostic request(s) and a corresponding diagnostic response(s) between any of the diagnostic testing devices 112, the diagnostic testing applications 116, and the controllers 120. For example, the PDU router 104 may route a diagnostic request(s) from a diagnostic client (e.g., a diagnostic testing device 112, a diagnostic testing application 116, a controller 120, etc.) to a diagnostic server (e.g., a diagnostic testing device 112, a diagnostic testing application 116, a controller 120, etc.), and the PDU router 104 may route a corresponding diagnostic response(s) from the diagnostic server to the diagnostic client. The diagnostic server may be referred to as a diagnostic target.

In some aspects, a diagnostic testing device 112 (e.g., any of diagnostic testing device 112-*a* through diagnostic testing device 112-*n*) may be internal to the vehicle 100 (e.g., mechanically and/or electronically integrated with the vehicle 100). Additionally, or alternatively, a diagnostic testing device 112 (e.g., any of diagnostic testing device 112-*a* through diagnostic testing device 112-*n*) may be external to the vehicle 100.

A controller 120 (e.g., any of controller 120-*a* through controller 120-*n*) may be an embedded system capable of controlling one or more electrical systems or subsystems in the vehicle 100. For example, a controller 120 (e.g., controller 120-*a*) may be an ECU (also referred to herein as an electronic control module (ECM)). In some cases, a controller 120 may be an ECU such as an engine control module (ECM), a powertrain control module (PCM), a transmission control module (TCM), a brake control module (BCM or EBCM), a central control module (CCM), a central timing module (CTM), a general electronic module (GEM), a body control module (BCM), suspension control module (SCM), a control unit, or a control module, and is not limited thereto. In some examples, a controller 120 (e.g., any of controller 120-*a* through controller 120-*n*) may be a CAN ECU, a local interconnect network (LIN) ECU, or the like.

According to example aspects of the present disclosure, the vehicle system 101 may support overlaps between the multiple routing paths. For example, electrical interconnections included in a routing path (e.g., between diagnostic testing device 112-*a* and controller 120-*a*) may overlap electrical interconnections included in at least one other routing path (e.g., between diagnostic testing device 112-*b* and controller 120-*a*).

The PDU router 104 may include a diagnostic manager 108. The diagnostic manager 108 may also be referred to herein as a diagnostic helper, a diagnostic assistant, or a PDU routing engine. In some aspects, the diagnostic manager 108 may include a list (e.g., a table, a lookup table, a registry, etc.) of PDU identifiers for matching diagnostic requests with diagnostic responses. In an example, the list may be a pre-generated list of PDU identifiers. In some aspects, when routing a diagnostic response from a diagnostic server (e.g., controller 120-*a*) to a diagnostic client (e.g., diagnostic testing device 112-*a*), the diagnostic manager 108 may use the list of PDU identifiers to differentiate between multiple routing paths between diagnostic clients (e.g., diagnostic testing devices 112, diagnostic testing applications 116, etc.) and the diagnostic server (e.g., controller 120-*a*).

In some aspects, the diagnostic manager 108 may differentiate between the multiple routing paths by tracking from where (e.g., from which diagnostic client) each diagnostic request originated. For example, the diagnostic manager 108 may differentiate between the multiple routing paths by remembering the latest (e.g., most recent) diagnostic request to a diagnostic server (e.g., controller 120-*a*). In an example, the diagnostic manager 108 may remember (e.g., maintain in a memory) a PDU identifier associated with the latest diagnostic request. Accordingly, for example, the diagnostic manager 108 may remember the routing path between the diagnostic server (e.g., controller 120-*a*) and a diagnostic client (e.g., diagnostic testing device 112-*a*) that provided the latest diagnostic request.

When the PDU router 104 receives a diagnostic response from the diagnostic server (e.g., controller 120-*a*), the diagnostic manager 108 may match the diagnostic response to the latest diagnostic request, based on a PDU identifier associated with the diagnostic response and the PDU identifier associated with the latest diagnostic request. Accordingly, for example, the PDU router 104 (e.g., using the diagnostic manager 108 and the list of PDU identifiers) may route the diagnostic response to the diagnostic client (e.g., diagnostic testing device 112-*a*) that provided the latest diagnostic request. In an example, the PDU router 104 may route the diagnostic response to the diagnostic client (e.g., diagnostic testing device 112-*a*) using the routing path via which the diagnostic client provided the latest diagnostic request.

The vehicle system 101 (e.g., the PDU router 104, the diagnostic manager 108, a diagnostic testing device 112, a controller 120, etc.) may be implemented by aspects of a communications system 400 (later described with reference to FIG. 4), vehicle computing device 604 (later described with reference to FIG. 6), and/or a computer system 700 (later described with reference to FIG. 7). In some cases, the controllers 120 may be implemented by aspects of vehicle control system 448 and/or communications subsystem 450 later described with reference to FIGS. 4 and 5. The list (e.g., a table, a lookup table, a registry, etc.) of PDU identifiers described herein may be implemented at a database (e.g., database 618 later described with reference to FIG. 6) and/or a memory (e.g., storage device(s) 720 later described with reference to FIG. 7).

Figure 2:
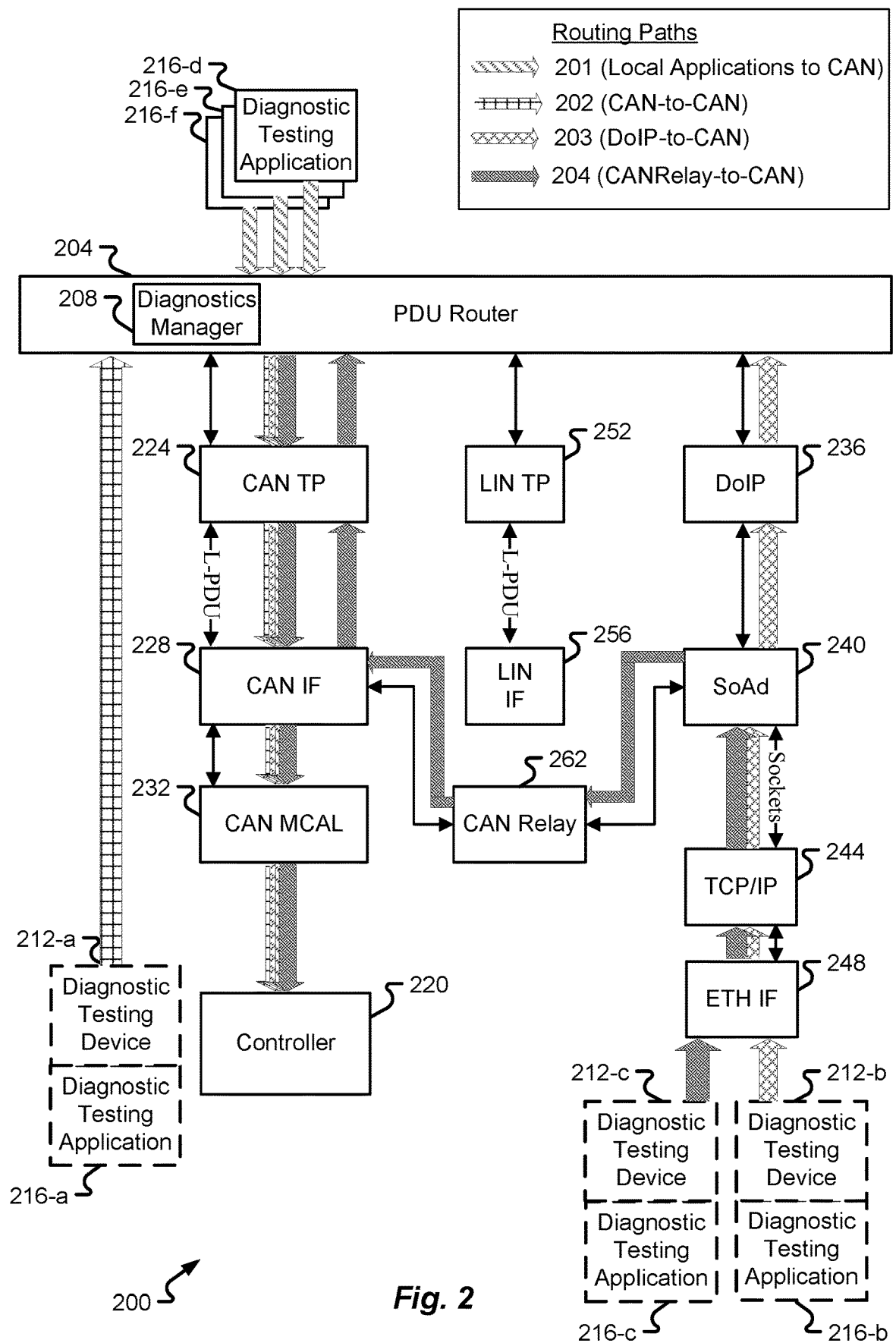
FIG. 2 illustrates an example of a system that supports routing multiple diagnostic pathways in accordance with aspects of the present disclosure.

FIG. 2 illustrates an example of a system 200 that supports routing multiple diagnostic pathways (e.g., routing paths 201 through 204) in accordance with aspects of the present disclosure. The system 200 may be an example of the vehicle system 101 described with reference to FIG. 1. For example, the system 200 may include a PDU router 204, diagnostic testing devices 212 (e.g., diagnostic testing device 212-*a* through diagnostic testing device 212-*c*), diagnostic testing applications 216 (e.g., diagnostic testing application 216-*a* through diagnostic testing application 216-*d*), and a controller 220.

In the example of FIG. 2, the routing paths 201 through 204 are illustrative of the direction of diagnostic requests. It is to be understood that the routing paths 201 through 204 also support the direction of diagnostic responses (e.g., opposite to the example direction of the arrows illustrated in FIG. 2).

The system 200 may support (e.g., using the PDU router 204 and a diagnostic manager 208) routing of PDUs between diagnostic testing devices 212, diagnostic testing applications 216, and the controller 220. In some aspects, the PDUs may include diagnostic requests and diagnostic responses. The PDU router 204, diagnostic manager 208, the diagnostic testing devices 212, the diagnostic testing applications 216, and the controller 220 may include examples of aspects of like elements described herein with reference to FIG. 1.

The controller 220 may be an ECU. For example, the controller 220 may be a CAN ECU with diagnostics. In some examples, the controller 220 may be a LIN ECU with diagnostics. In another example, the controller 220 may be a UDS server local to the system 200.

Examples are described in which the controller 220 may receive a diagnostic request(s) from a diagnostic client, during a client diagnostic session established between the controller 220 and the diagnostic client. The diagnostic client may be any of the diagnostic testing devices 212, any of the diagnostic testing applications 216, or another controller 220 (not illustrated). The controller 220 may provide a corresponding diagnostic response(s) to the PDU router 204, and the PDU router 204 may route the diagnostic response(s) to the diagnostic client. In such example cases, the controller 220 may be referred to as a diagnostic server or a diagnostic target.

In the examples described herein, diagnostic requests and diagnostic responses are communicated via modules associated with a CAN protocol and/or DoIP. Aspects of the techniques described herein are not limited thereto, and the techniques described herein support communication of diagnostic requests and diagnostic responses via modules associated with other protocols (e.g., LIN TP module 252, LIN IF module 256, etc. associated with a LIN protocol).

In a first example, the PDU router 204 may support the exchange of diagnostic requests and diagnostic responses between a diagnostic testing application 216 (e.g., any of diagnostic testing application 216-*d* through diagnostic testing application 216-*f*, locally implemented at the system 200 and capable of interacting with diagnostics) and the controller 220, using a routing path 201. For example, the PDU router 204 may receive a diagnostic request from the diagnostic testing application 216-*d*, and the PDU router 204 may route the diagnostic request to the controller 220 (and route a corresponding diagnostic response to the diagnostic testing application 216-*d*) via a 'CAN bus A' (not illustrated) local to the system 200. Accordingly, for example, the routing path 201 may include the PDU router 204, the CAN TP module 224, the CAN IF module 228, and the CAN MCAL module 232 (e.g., where the PDU router 204 communicates with a diagnostic testing application 216-*d*, the CAN TP module 224, the CAN IF module 228, and the CAN MCAL module 232 using 'CAN bus A'). In some aspects, each of diagnostic testing application 216-*d* through diagnostic testing application 216-*f* may have a respective routing pathway to the PDU router 204. In an example, diagnostic testing application 216-*d* through diagnostic testing application 216-*f* may share a portion of the routing path 201 (e.g., the portion of the routing path 201 between the PDU router 204 and the controller 220).

In a second example, the PDU router 204 may support the exchange of diagnostic requests and diagnostic responses between diagnostic testing device 212-*a* (and/or diagnostic testing application 216-*a*) and the controller 220, using a routing path 202. In some aspects, the PDU router 204 may support the exchange of diagnostic requests and diagnostic responses between multiple diagnostic testing devices (e.g., diagnostic testing devices additional to diagnostic testing device 212-*a*) and/or multiple diagnostic testing applications (e.g., diagnostic testing applications additional to diagnostic testing application 216-*a*) and the controller 220, using the routing path 202. In an example, the diagnostic testing device 212-*a* (and/or diagnostic testing application 216-*a*) may be connected to the PDU router 204 using a CAN bus (also referred to herein as 'CAN bus B' (not illustrated)) different from the 'CAN bus A'. The 'CAN bus B' may be directly connected and routed to the 'CAN bus A' via the PDU router 204. Accordingly, for example, the PDU router 204 may support the exchange of diagnostic requests and diagnostic responses between the diagnostic testing device 212-*a* (and/or the diagnostic testing application 216-*a*) and the controller 220, using the 'CAN bus B' and the 'CAN bus A' (e.g., using a CAN-to-CAN connection).

For example, the PDU router 204 may receive a diagnostic request from the diagnostic testing application 216-*a* (or alternatively, from the diagnostic testing application 216-*a*) using the 'CAN bus B'. The PDU router 204 may route the diagnostic request to the controller 220 using the 'CAN bus A' (e.g., via the CAN TP module 224, the CAN IF module 228, and the CAN MCAL module 232). The PDU router 204 may receive a corresponding diagnostic response from the controller 220 via the 'CAN bus A' (e.g., via the CAN MCAL module 232, the CAN IF module 228, the CAN TP module 224). The PDU router 204 may route the diagnostic response to the diagnostic testing application 216-*a* using the 'CAN bus B'. Accordingly, for example, the routing path 202 may incorporate a CAN-to-CAN connection including the 'CAN bus B', the PDU router 204, and the 'CAN bus A' (e.g., including the CAN TP module 224, the CAN IF module 228, and the CAN MCAL module 232).

In a third example, the PDU router 204 may support the exchange of diagnostic requests and diagnostic responses between diagnostic testing device 212-*b* (and/or diagnostic testing application 216-*b*) and the controller 220, using a routing path 203. In some aspects, the PDU router 204 may support the exchange of diagnostic requests and diagnostic responses between multiple diagnostic testing devices (e.g., diagnostic testing devices additional to diagnostic testing device 212-*b*) and/or multiple diagnostic testing applications (e.g., diagnostic testing applications additional to diagnostic testing application 216-*b*) and the controller 220, using the routing path 203. In an example, the diagnostic testing device 212-*b* (and/or diagnostic testing application 216-*b*) may be connected to the PDU router 204 using Diagnostics over Internet Protocol (DoIP) (e.g., via a DoIP module 236). DoIP facilitates the use of automotive diagnostic services exposed through UDS over TCP/IP on an Ethernet network. The DoIP module 236 may be an operating system independent software module which may support transmission of diagnostic communications between test equipment (e.g., diagnostic testing device 212-*b*) and vehicle electronic components (e.g., controller 220) using IP.

The PDU router 204 may support the exchange of diagnostic requests and diagnostic responses between the diagnostic testing device 212-*b* (and/or the diagnostic testing application 216-*b*) and the controller 220, using DoIP and the 'CAN bus A' (e.g., using a DoIP-to-CAN connection).

For example, the PDU router 204 may receive a diagnostic request from the diagnostic testing device 212-*b* (or alternatively, from the diagnostic testing application 216-*b*) using DoIP. In an example, the diagnostic testing device 212-*b* may transmit the diagnostic request to the PDU router 204 via a 'DoIP path' including Ethernet IF (ETH IF) module 248, a TCP/IP module 244 (e.g., a socket based TCP/IP stack), a socket adapter (SoAd) module 240, and the DoIP module 236. The SoAd module 240 creates an interface between the PDU router 204 (e.g., a communication service module using PDUs) and the TCP-IP module 244 (e.g., a socket based TCP/IP stack). The SoAd module 240 may map I-PDU identifiers to socket connections and vice versa. In some cases, the SoAd module 240 may receive UDP messages or TCP streams (e.g., where the UDP messages or TCP streams may include a diagnostic request) and convert the same into PDUs compatible with the system 200 (e.g., compatible with the PDU router 204, the CAN TP module 224, the CAN IF module 228, the CAN MCAL module 232, the controller 220, etc.).

The PDU router 204 may route the diagnostic request (e.g., converted as a PDU) to the controller 220 using the 'CAN bus A' (e.g., via the CAN TP module 224, the CAN IF module 228, and the CAN MCAL module 232). The PDU router 204 may receive a corresponding diagnostic response from the controller 220 using the 'CAN bus A' (e.g., via the CAN MCAL module 232, the CAN IF module 228, the CAN TP module 224). The PDU router 204 may route the diagnostic response to the diagnostic testing application 216-*b* via the 'DoIP path' described herein (e.g., via the DoIP module 236, SoAd module 240, TCP/IP module 244, and ETH IF module 248). Accordingly, for example, the routing path 203 may incorporate a DoIP-to-CAN connection including the 'DoIP path', the PDU router 204, and the 'CAN bus A' (e.g., including the CAN TP module 224, the CAN IF module 228, and the CAN MCAL module 232).

In a fourth example, the PDU router 204 may support the exchange of diagnostic requests and diagnostic responses between diagnostic testing device 212-*c* (and/or diagnostic testing application 216-*c*) and the controller 220, using a routing path 204. In some aspects, the PDU router 204 may support the exchange of diagnostic requests and diagnostic responses between multiple diagnostic testing devices (e.g., diagnostic testing devices additional to diagnostic testing device 212-*c*) and/or multiple diagnostic testing applications (e.g., diagnostic testing applications additional to diagnostic testing application 216-*c*) and the controller 220, using the routing path 204. In an example, the diagnostic testing device 212-*c* (and/or diagnostic testing application 216-*c*) may be connected to the PDU router 204 using a CAN bus (also referred to herein as 'CAN bus C' (not illustrated)) different from the 'CAN bus A'. The 'CAN bus C' may be connected and routed to the 'CAN bus A' using a CAN relay 262 and the PDU router 204. Accordingly, for example, the PDU router 204 may support the exchange of diagnostic requests and diagnostic responses between the diagnostic testing device 212-c (and/or the diagnostic testing application 216-c) and the controller 220, using the 'CAN bus C' and the 'CAN bus A' (e.g., using a CANRelay-to-CAN connection).

For example, the PDU router 204 may receive a diagnostic request from the diagnostic testing device 212-c (or alternatively, from the diagnostic testing application 216-c) using the 'CAN bus C'. In an example, the diagnostic testing device 212-c may transmit the diagnostic request to the PDU router 204 via a 'CAN relay path' including ETH IF module 248, TCP/IP module 244, SoAd module 240, the CAN relay module 262, the CAN IF module 228, and the CAN TP module 224.

The PDU router 204 may route the diagnostic request to the controller 220 using the 'CAN bus A' (e.g., using the CAN TP module 224, the CAN IF module 228, and the CAN MCAL module 232). The PDU router 204 may receive a corresponding diagnostic response from the controller 220 using the 'CAN bus A' (e.g., using the CAN MCAL module 232, the CAN IF module 228, the CAN TP module 224). The PDU router 204 may route the diagnostic response to the diagnostic testing application 216-a via the 'CAN relay path'. Accordingly, for example, the routing path 204 may incorporate a CANRelay-to-CAN connection including the 'CAN bus C', the CAN relay module 262, the SoAd module 240, the TCP/IP module 244, the ETH IF module 2xx, the PDU router 204, and the 'CAN bus A' (e.g., including the CAN TP module 224, the CAN IF module 228, and the CAN MCAL module 232).

According to example aspects of the present disclosure, the PDU router 204 (e.g., using the diagnostic manager 208) may differentiate between multiple routing paths between the controller 220 and multiple diagnostic clients (e.g., the diagnostic testing application 216-d through the diagnostic testing application 216-f (local application to CAN), the diagnostic testing device 212-a (CAN-to-CAN), the diagnostic testing device 212-b (DoIP-to-CAN), the diagnostic testing device 212-c (CANRelay-to-CAN), etc.). Example aspects of the present disclosure may support routing between the controller 220 and multiple diagnostic clients (e.g., multiple diagnostic testing devices 212 and/or diagnostic testing applications 216), regardless of where the diagnostic clients are located.

For example, the PDU router 204 (e.g., using the diagnostic manager 208) may differentiate between the multiple routing paths by remembering the latest (e.g., most recent) diagnostic request to the controller 220.

In an example, the PDU router 204 may respectively receive different diagnostic requests (e.g., at different temporal instances) from any of the diagnostic testing application 216-d through diagnostic testing application 216-f (local application to CAN), the diagnostic testing device 212-a (CAN-to-CAN), the diagnostic testing application 216-a (CAN-to-CAN), the diagnostic testing device 212-b (DoIP-to-CAN), the diagnostic testing application 216-b (DoIP-to-CAN), the diagnostic testing device 212-c (CANRelay-to-CAN), and the diagnostic testing application 216-c (CANRelay-to-CAN).

In an example, the diagnostic manager 208 may remember (e.g., maintain in a memory) a PDU identifier associated with each of the diagnostic requests. In some aspects, the diagnostic manager 208 may remember (e.g., maintain in a memory) the PDU identifier associated with the latest diagnostic request (e.g., the latest or most recent diagnostic request received at the PDU router 204).

For example, the diagnostic manager 208 may identify that a diagnostic request from the diagnostic testing device 212-a (CAN-to-CAN) is the latest diagnostic request received at the PDU router 204. The diagnostic manager 208 may remember the diagnostic testing device 212-a as the source of the latest diagnostic request. In an example, the diagnostic manager 208 may remember (e.g., maintain in a memory) the PDU identifier associated with the diagnostic request from the diagnostic testing device 212-a.

When the PDU router 204 receives a diagnostic response from the controller 220, the diagnostic manager 208 may identify a PDU identifier associated with the diagnostic response. The diagnostic manager 208 may determine that the PDU identifier associated with the diagnostic response is matched with (e.g., according to the table, lookup table, registry, etc.) the PDU identifier associated with the diagnostic request from the diagnostic testing device 212-a. For example, PDU identifiers associated with diagnostic requests and PDU identifiers associated with diagnostic responses may be established at generation time. In an example, at generation time, PDU identifiers for diagnostic requests may be paired with PDU identifiers associated with diagnostic responses, and the PDU identifiers may be stored as a tuple in a table. Accordingly, for example, the PDU router 204 may route the diagnostic response to the diagnostic testing device 212-a, using the routing path 201 (e.g., including 'CAN bus B') via which the diagnostic testing device 212-a provided the diagnostic request to the PDU router 204.

In some aspects, the PDU identifier associated with the diagnostic response may be the same as the PDU identifier associated with the diagnostic request. In some other aspects, the PDU identifier associated with the diagnostic response may be different from the PDU identifier associated with the diagnostic request.

Although the example described herein describes the diagnostic request from the diagnostic testing device 212-a (CAN-to-CAN) as the latest diagnostic request received at the PDU router 204, aspects of the present disclosure are not limited thereto. For example, the latest diagnostic request received at the PDU router 204 may be from any of diagnostic client (e.g., any of the diagnostic testing devices 212 and diagnostic testing applications 216), and the diagnostic manager 208 may remember the diagnostic client that provided the latest diagnostic request as a corresponding source. The diagnostic manager 208 may remember (e.g., maintain in a memory) the PDU identifier associated with the diagnostic request. When the PDU router 204 receives a diagnostic response from the controller 220, the diagnostic manager 208 may match the diagnostic response to the latest diagnostic request, based on a PDU identifier associated with the diagnostic response and the PDU identifier associated with the latest diagnostic request.

Accordingly, for example, the PDU router 204 (e.g., using the diagnostic manager 208 and the list of PDU identifiers) may route the diagnostic response to the diagnostic client that provided the latest diagnostic request. In an example, the PDU router 204 may route the diagnostic response to the diagnostic client using the routing path (e.g., routing path 201, routing path 202, etc.) via which the diagnostic client provided the latest diagnostic request.

Each routing path between a diagnostic client and a diagnostic server may include electrical interconnections between the diagnostic client and the diagnostic server. In some aspects, the routing paths (e.g., routing path 201 through routing path 204) may be static (e.g., fixed) routing paths. Aspects of the present disclosure may support overlaps between the routing path 201 through routing path 204. For example, as illustrated in FIG. 2, routing path 201 through routing path 204 may share a single, shared pathway (also referred to as an overlapping shared pathway) from the PDU router 204 to the controller 220. In an example, routing path 203 and routing path 204 may share a single, shared pathway from the ETH IF module 248 to the SoAd module 240.

For example, electrical interconnections included in a routing path may overlap electrical interconnections included in a portion of at least one other routing path. In an example, portions of the routing path 201 through routing path 204 overlap from the PDU router 204 to the controller 220 (e.g., each of the routing path 201 through routing path 204 traverse the CAN TP module 224, the CAN IF module 228, and the CAN MCAL module 232). In another example, portions of the routing path 203 and the routing path 204 overlap from the PDU router 204 to the controller 220, and additional portions of the routing path 203 and the routing path 204 overlap from the SoAd module 240 to the ETH IF module 248 (e.g., the routing path 203 and the routing path 204 each traverse the SoAd module 240, the TCP/IP module 244, and the ETH IF module 248).

According to example aspects of the present disclosure, the system may support routing of PDUs between diagnostic clients (e.g., diagnostic testing devices 212, diagnostic testing applications 216) and multiple diagnostic targets (e.g., controller 220, other controllers, etc.). For example, though the examples herein are described with reference to the controller 220 as the diagnostic target, aspects of the present disclosure may be applied to multiple simultaneous client diagnostic sessions established at multiple diagnostic targets (e.g., controller 220, other controllers, etc.). For example, the routing techniques described herein may support routing PDUs (e.g., routing diagnostic requests and diagnostic responses according to corresponding routing paths) between the controller 220 and any of the diagnostic testing devices 212 and diagnostic testing applications 216, while simultaneously routing PDUs (e.g., diagnostic requests, diagnostic responses, etc.) between another controller (not illustrated) and any of the diagnostic testing devices 212 and diagnostic testing applications 216.

In some aspects of the present disclosure, the system 200 may support receiving (e.g., at the PDU router 204, at the controller 220) additional diagnostic requests from other sources, before providing a diagnostic response corresponding to a first diagnostic request. In some aspects, the system 200 may support maintaining client request ordering (e.g., providing and routing a diagnostic response corresponding to the first diagnostic request, prior to providing and routing a diagnostic response corresponding to a subsequent diagnostic request). In some other aspects, the system 200 may not support maintaining client request ordering.

In some aspects of the present disclosure, each diagnostic request may suppress a diagnostic response (e.g., for functional requests). For example, a diagnostic request may support suppression of a diagnostic response based on the value of a UDS SuppressPosReplyBit.

Figure 3:
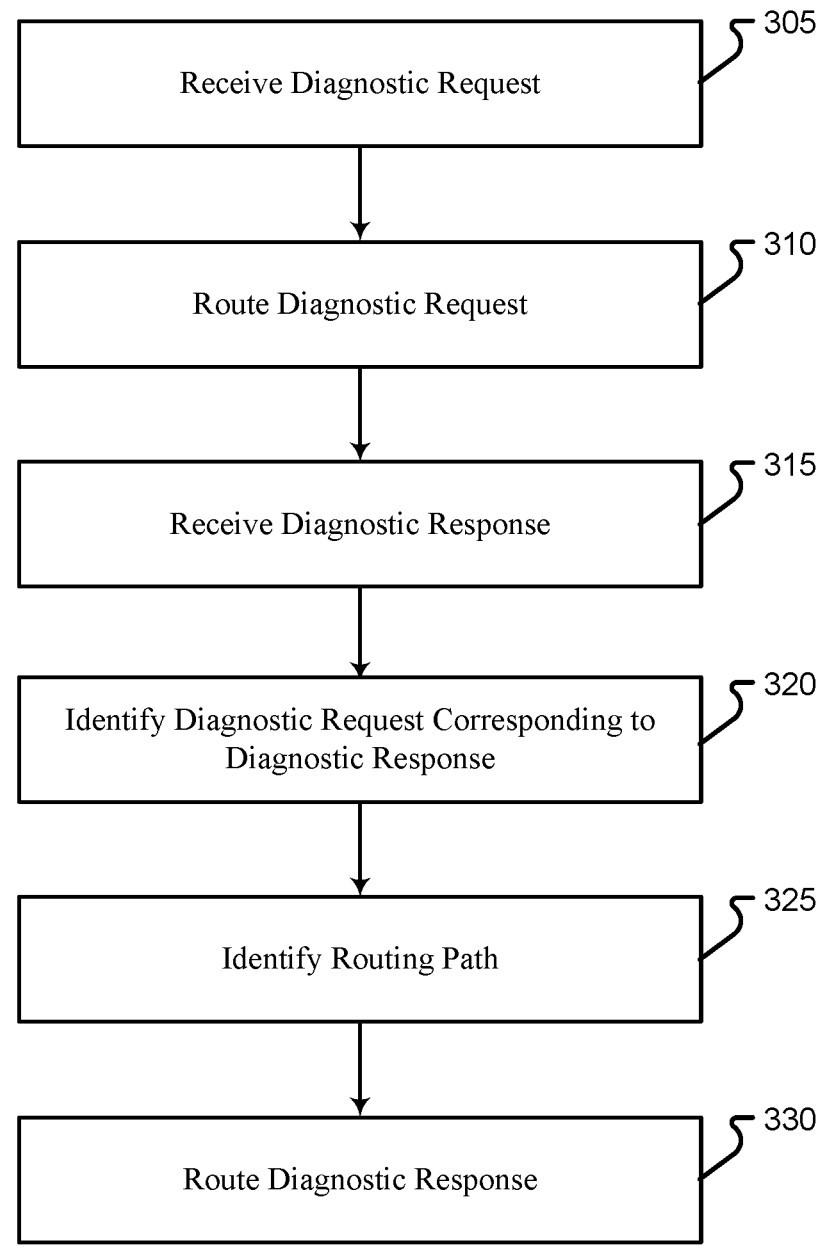
FIG. 3 illustrates an example of a process flow that supports routing multiple diagnostic pathways in accordance with aspects of the present disclosure.

FIG. 3 illustrates an example of a process flow 300 that supports routing multiple diagnostic pathways in accordance with aspects of the present disclosure. In some examples, process flow 300 may implement aspects of the vehicle 100, the vehicle system 101, and the system 200 described with reference to FIGS. 1 and 2.

In the following description of the process flow 300, the operations may be performed in a different order than the order shown, or the operations may be performed in different orders or at different times. Certain operations may also be left out of the process flow 300, or other operations may be added to the process flow 300.

It is to be understood that while a PDU router 104 is described as performing a number of the operations of process flow 300, any device (e.g., another PDU router 104) may perform the operations shown.

At 305, the PDU router 104 may receive a diagnostic request from a diagnostic client.

At 310, the PDU router 104 may route the diagnostic request to a diagnostic target. In some aspects, the diagnostic request may include a request for a diagnostic response.

In some aspects, the diagnostic client may include at least one of: a first client device coupled to the diagnostic target via a first communications bus; a second client device coupled to the diagnostic target via a second communications bus, where the first communications bus and the second communications bus are of a first communication protocol type; a third client device coupled to the diagnostic target via a third communications bus, where the third communications bus is of a second communication protocol type; and a fourth client device coupled to the diagnostic target via a fourth communications bus and a relay device; where, the fourth communications bus and the relay device are of the first communication protocol type.

In some aspects, the first communication protocol type may include a CAN protocol; and the second communication protocol type may include a DoIP.

In some aspects, the diagnostic target may include at least one of: a diagnostic server; a CAN ECU; a LIN ECU; and a local UDS server.

At 315, the PDU router 104 may receive a diagnostic response. In some aspects, the diagnostic response is generated at the diagnostic target based on the diagnostic request.

At 320, the PDU router 104 may identify a diagnostic request corresponding to the diagnostic response, based on a comparison of a first PDU identifier associated with the diagnostic request and a second PDU identifier associated with the diagnostic response.

At 325, the PDU router 104 may identify a routing path between the diagnostic target and the diagnostic client based on the first PDU identifier and the second PDU identifier, where the routing path is associated with the diagnostic request.

At 330, the PDU router 104 may route the diagnostic response to the diagnostic client associated with the diagnostic request.

In some aspects, routing the diagnostic response to the diagnostic client may include transmitting the diagnostic response to the diagnostic client based on the routing path.

In some aspects, the routing path overlaps at least a portion of a second routing path between the diagnostic target and a second diagnostic client. In some aspects, the routing path may include a set of electrical interconnections between the diagnostic target and the diagnostic client; the second routing path may include a second set of electrical interconnections between the diagnostic target and the second diagnostic client; and the set of electrical interconnections at least partially overlaps the second set of electrical interconnections.

In some examples not illustrated, the PDU router 104 may generate a set of PDU identifiers, the set of PDU identifiers including the first PDU identifier and the second PDU identifier. In some aspects, each PDU identifier of the set of PDU identifiers corresponds to a previous diagnostic request of a set of previous diagnostic requests and a candidate diagnostic client of a set of candidate diagnostic clients; the set of previous diagnostic requests may include the diagnostic request; and the set of candidate diagnostic clients may include the diagnostic client. In some aspects, each PDU identifier is associated with a routing path between a diagnostic target and a diagnostic client of the set of candidate diagnostic clients.

Figure 4:
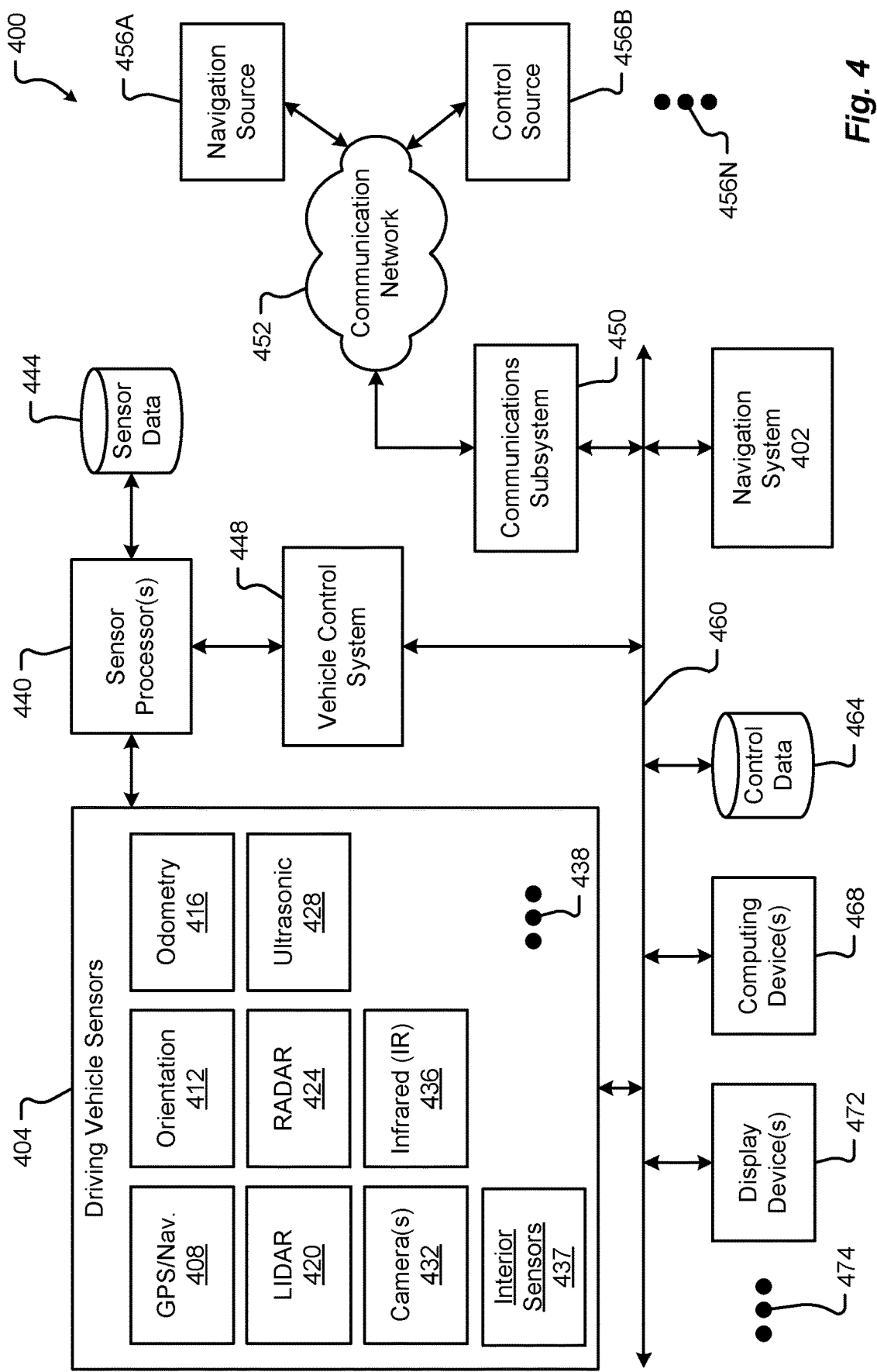
FIG. 4 is a block diagram illustrating an example of a communication environment of the vehicle in accordance with aspects of the present disclosure.

FIG. 4 is a block diagram illustrating an example of a communication environment of the vehicle 100 in accordance with aspects of the present disclosure.

The communication system 400 may include one or more vehicle driving vehicle sensors and systems 404, sensor processors 430, sensor data memory 434, vehicle control system 438, communications subsystem 450, control data 464, computing devices 468, display devices 472, and other components 474 that may be associated with a vehicle 100. These associated components may be electrically and/or communicatively coupled to one another via at least one bus 460. In some embodiments, the one or more associated components may send and/or receive signals across a communication network 452 to at least one of a navigation source 456A, a control source 456B, or some other entity 456N.

In accordance with at least some embodiments of the present disclosure, the communication network 452 may comprise any type of known communication medium or collection of communication media and may use any type of protocols, such as SIP, TCP/IP, SNA, IPX, AppleTalk, and the like, to transport messages between endpoints. The communication network 452 may include wired and/or wireless communication technologies. The Internet is an example of the communication network 452 that constitutes an Internet Protocol (IP) network consisting of many computers, computing networks, and other communication devices located all over the world, which are connected through many telephone systems and other means. Other examples of the communication network 452 include, without limitation, a standard Plain Old Telephone System (POTS), an Integrated Services Digital Network (ISDN), the Public Switched Telephone Network (PSTN), a Local Area Network (LAN), such as an Ethernet network, a Token-Ring network and/or the like, a Wide Area Network (WAN), a virtual network, including without limitation a virtual private network ("VPN"); the Internet, an intranet, an extranet, a cellular network, an infra-red network; a wireless network (e.g., a network operating under any of the IEEE 802.9 suite of protocols, the Bluetooth® protocol known in the art, and/or any other wireless protocol), and any other type of packet-switched or circuit-switched network known in the art and/or any combination of these and/or other networks. In addition, it can be appreciated that the communication network 452 need not be limited to any one network type, and instead may be comprised of a number of different networks and/or network types. The communication network 452 may comprise a number of different communication media such as coaxial cable, copper cable/wire, fiber-optic cable, antennas for transmitting/receiving wireless messages, and combinations thereof.

The driving vehicle sensors and systems 404 may include at least one navigation 408 (e.g., global positioning system (GPS), etc.), orientation 412, odometry 416, LIDAR 420, RADAR 424, ultrasonic 428, camera 432, infrared (IR) 436, and/or other sensor or system 438. These driving vehicle sensors and systems 404 may be similar, if not identical, to the sensors and systems 116A-K, 112 described in conjunction with FIGS. 1 and 2.

The navigation sensor 408 may include one or more sensors having receivers and antennas that are configured to utilize a satellite-based navigation system including a network of navigation satellites capable of providing geolocation and time information to at least one component of the vehicle 100. Examples of the navigation sensor 408 as described herein may include, but are not limited to, at least one of Garmin® GLO™ family of GPS and GLONASS combination sensors, Garmin® GPS 15×™ family of sensors, Garmin® GPS 16×™ family of sensors with high-sensitivity receiver and antenna, Garmin® GPS 18×OEM family of high-sensitivity GPS sensors, Dewetron DEWE-VGPS series of GPS sensors, GlobalSat 1-Hz series of GPS sensors, other industry-equivalent navigation sensors and/or systems, and may perform navigational and/or geolocation functions using any known or future-developed standard and/or architecture.

The orientation sensor 412 may include one or more sensors configured to determine an orientation of the vehicle 100 relative to at least one reference point. In some embodiments, the orientation sensor 412 may include at least one pressure transducer, stress/strain gauge, accelerometer, gyroscope, and/or geomagnetic sensor. Examples of the navigation sensor 408 as described herein may include, but are not limited to, at least one of Bosch Sensortec BMX 160 series low-power absolute orientation sensors, Bosch Sensortec BMX055 9-axis sensors, Bosch Sensortec BMI055 6-axis inertial sensors, Bosch Sensortec BMI160 6-axis inertial sensors, Bosch Sensortec BMF055 9-axis inertial sensors (accelerometer, gyroscope, and magnetometer) with integrated Cortex M0+ microcontroller, Bosch Sensortec BMP280 absolute barometric pressure sensors, Infineon TLV494D-A1B6 4D magnetic sensors, Infineon TLI494D-W1B6 4D magnetic sensors, Infineon TL family of 4D magnetic sensors, Murata Electronics SCC2000 series combined gyro sensor and accelerometer, Murata Electronics SCC1400 series combined gyro sensor and accelerometer, other industry-equivalent orientation sensors and/or systems, which may perform orientation detection and/or determination functions using any known or future-developed standard and/or architecture.

The odometry sensor and/or system 416 may include one or more components that is configured to determine a change in position of the vehicle 100 over time. In some embodiments, the odometry system 416 may utilize data from one or more other sensors and/or systems 404 in determining a position (e.g., distance, location, etc.) of the vehicle 100 relative to a previously measured position for the vehicle 100. Additionally or alternatively, the odometry sensors 416 may include one or more encoders, Hall speed sensors, and/or other measurement sensors/devices configured to measure a wheel speed, rotation, and/or number of revolutions made over time. Examples of the odometry sensor/system 416 as described herein may include, but are not limited to, at least one of Infineon TLE4924/26/27/28C high-performance speed sensors, Infineon TL4941plusC(B) single chip differential Hall wheel-speed sensors, Infineon TL5041plusC Giant Magnetoresistance (GMR) effect sensors, Infineon TL family of magnetic sensors, EPC Model 25SP Accu-CoderPro™ incremental shaft encoders, EPC Model 40M compact incremental encoders with advanced magnetic sensing and signal processing technology, EPC Model 925 absolute shaft encoders, EPC Model 958 absolute shaft encoders, EPC Model MA46S/MA64S/SA46S absolute shaft encoders, Dynapar™ F18 commutating optical encoder, Dynapar™ HS45R family of phased array encoder sensors, other industry-equivalent odometry sensors and/or systems, and may perform change in position detection and/or determination functions using any known or future-developed standard and/or architecture.

The LIDAR sensor/system 420 may include one or more components configured to measure distances to targets using laser illumination. In some embodiments, the LIDAR sensor/system 420 may provide 4D imaging data of an environment around the vehicle 100. The imaging data may be processed to generate a full 460-degree view of the environment around the vehicle 100. The LIDAR sensor/system 420 may include a laser light generator configured to generate a plurality of target illumination laser beams (e.g., laser light channels). In some embodiments, this plurality of laser beams may be aimed at, or directed to, a rotating reflective surface (e.g., a mirror) and guided outwardly from the LIDAR sensor/system 420 into a measurement environment. The rotating reflective surface may be configured to continually rotate 460 degrees about an axis, such that the plurality of laser beams is directed in a full 460-degree range around the vehicle 100. A photodiode receiver of the LIDAR sensor/system 420 may detect when light from the plurality of laser beams emitted into the measurement environment returns (e.g., reflected echo) to the LIDAR sensor/system 420. The LIDAR sensor/system 420 may calculate, based on a time associated with the emission of light to the detected return of light, a distance from the vehicle 100 to the illuminated target. In some embodiments, the LIDAR sensor/system 420 may generate over 2.0 million points per second and have an effective operational range of at least 100 meters. Examples of the LIDAR sensor/system 420 as described herein may include, but are not limited to, at least one of Velodyne® LiDAR™ HDL-64E 64-channel LIDAR sensors, Velodyne® LiDAR™ HDL-42E 42-channel LIDAR sensors, Velodyne® LiDAR™ PUCK™ VLP-16 16-channel LIDAR sensors, Leica Geosystems Pegasus: Two mobile sensor platform, Garmin® LIDAR-Lite v4 measurement sensor, Quanergy M8 LiDAR sensors, Quanergy S4 solid state LiDAR sensor, LeddarTech® LeddarVU compact solid state fixed-beam LIDAR sensors, other industry-equivalent LIDAR sensors and/or systems, and may perform illuminated target and/or obstacle detection in an environment around the vehicle 100 using any known or future-developed standard and/or architecture.

The RADAR sensors 424 may include one or more radio components that are configured to detect objects/targets in an environment of the vehicle 100. In some embodiments, the RADAR sensors 424 may determine a distance, position, and/or movement vector (e.g., angle, speed, etc.) associated with a target over time. The RADAR sensors 424 may include a transmitter configured to generate and emit electromagnetic waves (e.g., radio, microwaves, etc.) and a receiver configured to detect returned electromagnetic waves. In some embodiments, the RADAR sensors 424 may include at least one processor configured to interpret the returned electromagnetic waves and determine locational properties of targets. Examples of the RADAR sensors 424 as described herein may include, but are not limited to, at least one of Infineon RASIC™ RTN7745PL transmitter and RRN7745PL/46PL receiver sensors, Autoliv ASP Vehicle RADAR sensors, Delphi L2C0051TR 77 GHz ESR Electronically Scanning Radar sensors, Fujitsu Ten Ltd. Automotive Compact 77 GHz 4D Electronic Scan Millimeter Wave Radar sensors, other industry-equivalent RADAR sensors and/or systems, and may perform radio target and/or obstacle detection in an environment around the vehicle 100 using any known or future-developed standard and/or architecture.

The ultrasonic sensors 428 may include one or more components that are configured to detect objects/targets in an environment of the vehicle 100. In some embodiments, the ultrasonic sensors 428 may determine a distance, position, and/or movement vector (e.g., angle, speed, etc.) associated with a target over time. The ultrasonic sensors 428 may include an ultrasonic transmitter and receiver, or transceiver, configured to generate and emit ultrasound waves and interpret returned echoes of those waves. In some embodiments, the ultrasonic sensors 428 may include at least one processor configured to interpret the returned ultrasonic waves and determine locational properties of targets. Examples of the ultrasonic sensors 428 as described herein may include, but are not limited to, at least one of Texas Instruments TIDA-00151 automotive ultrasonic sensor interface IC sensors, MaxBotix® MB8450 ultrasonic proximity sensor, MaxBotix® ParkSonar™-EZ ultrasonic proximity sensors, Murata Electronics MA40H1S-R open-structure ultrasonic sensors, Murata Electronics MA40S4R/S open-structure ultrasonic sensors, Murata Electronics MA58MF14-7N waterproof ultrasonic sensors, other industry-equivalent ultrasonic sensors and/or systems, and may perform ultrasonic target and/or obstacle detection in an environment around the vehicle 100 using any known or future-developed standard and/or architecture.

The camera sensors 432 may include one or more components configured to detect image information associated with an environment of the vehicle 100. In some embodiments, the camera sensors 432 may include a lens, filter, image sensor, and/or a digital image processer. It is an aspect of the present disclosure that multiple camera sensors 432 may be used together to generate stereo images providing depth measurements. Examples of the camera sensors 432 as described herein may include, but are not limited to, at least one of ON Semiconductor® MT9V024 Global Shutter VGA GS CMOS image sensors, Teledyne DALSA Falcon2 camera sensors, CMOSIS CMV50000 high-speed CMOS image sensors, other industry-equivalent camera sensors and/or systems, and may perform visual target and/or obstacle detection in an environment around the vehicle 100 using any known or future-developed standard and/or architecture.

The infrared (IR) sensors 436 may include one or more components configured to detect image information associated with an environment of the vehicle 100. The IR sensors 436 may be configured to detect targets in low-light, dark, or poorly-lit environments. The IR sensors 436 may include an IR light emitting element (e.g., IR light emitting diode (LED), etc.) and an IR photodiode. In some embodiments, the IR photodiode may be configured to detect returned IR light at or about the same wavelength to that emitted by the IR light emitting element. In some embodiments, the IR sensors 436 may include at least one processor configured to interpret the returned IR light and determine locational properties of targets. The IR sensors 436 may be configured to detect and/or measure a temperature associated with a target (e.g., an object, pedestrian, other vehicle, etc.). Examples of IR sensors 436 as described herein may include, but are not limited to, at least one of Opto Diode lead-salt IR array sensors, Opto Diode OD-850 Near-IR LED sensors, Opto Diode SA/SHA727 steady state IR emitters and IR detectors, FLIR® LS microbolometer sensors, FLIR® TacFLIR 480-HD InSb MWIR FPA and HD MWIR thermal sensors, FLIR® VOx 640×480 pixel detector sensors, Delphi IR sensors, other industry-equivalent IR sensors and/or systems, and may perform IR visual target and/or obstacle detection in an environment around the vehicle 100 using any known or future-developed standard and/or architecture.

The vehicle 100 can also include one or more interior sensors 437. Interior sensors 437 can measure characteristics of the inside environment of the vehicle 100.

A navigation system 402 can include any hardware and/or software used to navigate the vehicle either manually or autonomously. The navigation system 402 may be as described in conjunction with FIG. 4C.

In some embodiments, the driving vehicle sensors and systems 404 may include other sensors 438 and/or combinations of the sensors 406-437 described above. Additionally or alternatively, one or more of the sensors 406-437 described above may include one or more processors configured to process and/or interpret signals detected by the one or more sensors 406-437. In some embodiments, the processing of at least some sensor information provided by the vehicle sensors and systems 404 may be processed by at least one sensor processor 430. Raw and/or processed sensor data may be stored in a sensor data memory 434 storage medium. In some embodiments, the sensor data memory 434 may store instructions used by the sensor processor 430 for processing sensor information provided by the sensors and systems 404. In any event, the sensor data memory 434 may be a disk drive, optical storage device, solid-state storage device such as a random access memory ("RAM") and/or a read-only memory ("ROM"), which can be programmable, flash-updateable, and/or the like.

The vehicle control system 438 may receive processed sensor information from the sensor processor 430 and determine to control an aspect of the vehicle 100. Controlling an aspect of the vehicle 100 may include presenting information via one or more display devices 472 associated with the vehicle, sending commands to one or more computing devices 468 associated with the vehicle, and/or controlling a driving operation of the vehicle. In some embodiments, the vehicle control system 438 may correspond to one or more computing systems that control driving operations of the vehicle 100 in accordance with the Levels of driving autonomy described above. In one embodiment, the vehicle control system 438 may operate a speed of the vehicle 100 by controlling an output signal to the accelerator and/or braking system of the vehicle. In this example, the vehicle control system 438 may receive sensor data describing an environment surrounding the vehicle 100 and, based on the sensor data received, determine to adjust the acceleration, power output, and/or braking of the vehicle 100. The vehicle control system 438 may additionally control steering and/or other driving functions of the vehicle 100.

The vehicle control system 438 may communicate, in real-time, with the driving sensors and systems 404 forming a feedback loop. In particular, upon receiving sensor information describing a condition of targets in the environment surrounding the vehicle 100, the vehicle control system 438 may autonomously make changes to a driving operation of the vehicle 100. The vehicle control system 438 may then receive subsequent sensor information describing any change to the condition of the targets detected in the environment as a result of the changes made to the driving operation. This continual cycle of observation (e.g., via the sensors, etc.) and action (e.g., selected control or non-control of vehicle operations, etc.) allows the vehicle 100 to operate autonomously in the environment.

In some embodiments, the one or more components of the vehicle 100 (e.g., the driving vehicle sensors 404, vehicle control system 438, display devices 472, etc.) may communicate across the communication network 452 to one or more entities 456A-N via a communications subsystem 450 of the vehicle 100. Embodiments of the communications subsystem 450 are described in greater detail in conjunction with FIG. 5. For instance, the navigation sensors 408 may receive global positioning, location, and/or navigational information from a navigation source 456A. In some embodiments, the navigation source 456A may be a global navigation satellite system (GNSS) similar, if not identical, to NAVSTAR GPS, GLONASS, EU Galileo, and/or the BeiDou Navigation Satellite System (BDS) to name a few.

In some embodiments, the vehicle control system 438 may receive control information from one or more control sources 456B. The control source 456 may provide vehicle control information including autonomous driving control commands, vehicle operation override control commands, and the like. The control source 456 may correspond to an autonomous vehicle control system, a traffic control system, an administrative control entity, and/or some other controlling server. It is an aspect of the present disclosure that the vehicle control system 438 and/or other components of the vehicle 100 may exchange communications with the control source 456 across the communication network 452 and via the communications subsystem 450.

Information associated with controlling driving operations of the vehicle 100 may be stored in a control data memory 464 storage medium. The control data memory 464 may store instructions used by the vehicle control system 438 for controlling driving operations of the vehicle 100, historical control information, autonomous driving control rules, and the like. In some embodiments, the control data memory 464 may be a disk drive, optical storage device, solid-state storage device such as a random access memory ("RAM") and/or a read-only memory ("ROM"), which can be programmable, flash-updateable, and/or the like.

In addition to the mechanical components described herein, the vehicle 100 may include a number of user interface devices. The user interface devices receive and translate human input into a mechanical movement or electrical signal or stimulus. The human input may be one or more of motion (e.g., body movement, body part movement, in two-dimensional or three-dimensional space, etc.), voice, touch, and/or physical interaction with the components of the vehicle 100. In some embodiments, the human input may be configured to control one or more functions of the vehicle 100 and/or systems of the vehicle 100 described herein. User interfaces may include, but are in no way limited to, at least one graphical user interface of a display device, steering wheel or mechanism, transmission lever or button (e.g., including park, neutral, reverse, and/or drive positions, etc.), throttle control pedal or mechanism, brake control pedal or mechanism, power control switch, communications equipment, etc.

Figure 5:
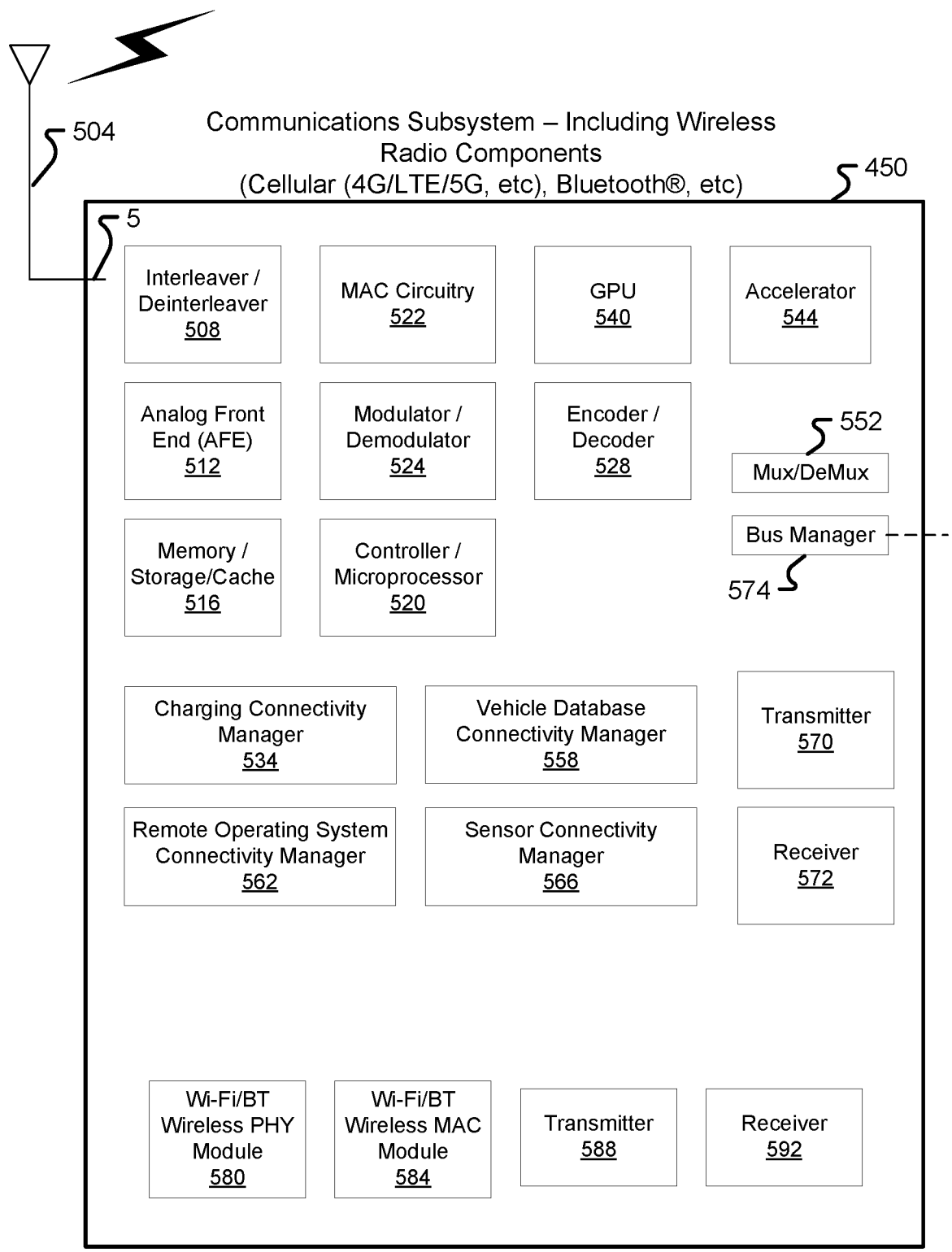
FIG. 5 is a block diagram illustrating an example of a communications subsystem of the vehicle in accordance with aspects of the present disclosure.

FIG. 5 illustrates a hardware diagram of communications componentry that can be optionally associated with the vehicle 100 in accordance with embodiments of the present disclosure.

The communications componentry can include one or more wired or wireless devices such as a transceiver(s) and/or modem that allows communications not only between the various systems disclosed herein but also with other devices, such as devices on a network, and/or on a distributed network such as the Internet and/or in the cloud and/or with other vehicle(s).

The communications subsystem 450 can also include inter- and intra-vehicle communications capabilities such as hotspot and/or access point connectivity for any one or more of the vehicle occupants and/or vehicle-to-vehicle communications.

Additionally, and while not specifically illustrated, the communications subsystem 450 can include one or more communications links (that can be wired or wireless) and/or communications busses (managed by the bus manager 574), including one or more of CAN bus, OBD-II, ARCINC 429, Byteflight, CAN (Controller Area Network), D2B (Domestic Digital Bus), FlexRay, DC-BUS, IDB-1394, IEBus, I2C, ISO 9141-1/-2, J1708, J1587, J1850, J1939, ISO 11783, Keyword Protocol 2000, LIN (Local Interconnect Network), MOST (Media Oriented Systems Transport), Multifunction Vehicle Bus, SMARTwireX, SPI, VAN (Vehicle Area Network), and the like or in general any communications protocol and/or standard(s).

The various protocols and communications can be communicated one or more of wirelessly and/or over transmission media such as single wire, twisted pair, fiber optic, IEEE 1394, MIL-STD-1553, MIL-STD-1773, power-line communication, or the like. (All of the above standards and protocols are incorporated herein by reference in their entirety).

As discussed, the communications subsystem 450 enables communications between any of the inter-vehicle systems and subsystems as well as communications with non-collocated resources, such as those reachable over a network such as the Internet.

The communications subsystem 450, in addition to well-known componentry (which has been omitted for clarity), includes interconnected elements including one or more of: one or more antennas 504, an interleaver/deinterleaver 508, an analog front end (AFE) 512, memory/storage/cache 516, controller/microprocessor 520, MAC circuitry 522, modulator/demodulator 524, encoder/decoder 528, a plurality of connectivity managers 534, 558, 562, 566, GPU 540, accelerator 544, a multiplexer/demultiplexer 552, transmitter 570, receiver 572 and additional wireless radio components such as a Wi-Fi PHY/Bluetooth® module 580, a Wi-Fi/BT MAC module 584, additional transmitter(s) 588 and additional receiver(s) 592. The various elements in the device 450 are connected by one or more links/busses 5 (not shown, again for sake of clarity).

The device 450 can have one more antennas 504, for use in wireless communications such as multi-input multi-output (MIMO) communications, multi-user multi-input multi-output (MU-MIMO) communications Bluetooth®, LTE, 4G, 5G, Near-Field Communication (NFC), etc., and in general for any type of wireless communications. The antenna(s) 504 can include, but are not limited to one or more of directional antennas, omnidirectional antennas, monopoles, patch antennas, loop antennas, microstrip antennas, dipoles, and any other antenna(s) suitable for communication transmission/reception. In an exemplary embodiment, transmission/reception using MIMO may require particular antenna spacing. In another exemplary embodiment, MIMO transmission/reception can enable spatial diversity allowing for different channel characteristics at each of the antennas. In yet another embodiment, MIMO transmission/reception can be used to distribute resources to multiple users for example within the vehicle 100 and/or in another vehicle.

Antenna(s) 504 generally interact with the Analog Front End (AFE) 512, which is needed to enable the correct processing of the received modulated signal and signal conditioning for a transmitted signal. The AFE 512 can be functionally located between the antenna and a digital baseband system in order to convert the analog signal into a digital signal for processing and vice-versa.

The subsystem 450 can also include a controller/microprocessor 520 and a memory/storage/cache 516. The subsystem 450 can interact with the memory/storage/cache 516 which may store information and operations necessary for configuring and transmitting or receiving the information described herein. The memory/storage/cache 516 may also be used in connection with the execution of application programming or instructions by the controller/microprocessor 520, and for temporary or long term storage of program instructions and/or data. As examples, the memory/storage/cache 520 may comprise a computer-readable device, RAM, ROM, DRAM, SDRAM, and/or other storage device(s) and media.

The controller/microprocessor 520 may comprise a general purpose programmable processor or controller for executing application programming or instructions related to the subsystem 450. Furthermore, the controller/microprocessor 520 can perform operations for configuring and transmitting/receiving information as described herein. The controller/microprocessor 520 may include multiple processor cores, and/or implement multiple virtual processors. Optionally, the controller/microprocessor 520 may include multiple physical processors. By way of example, the controller/microprocessor 520 may comprise a specially configured Application Specific Integrated Circuit (ASIC) or other integrated circuit, a digital signal processor(s), a controller, a hardwired electronic or logic circuit, a programmable logic device or gate array, a special purpose computer, or the like.

The subsystem 450 can further include a transmitter(s) 570, 588 and receiver(s) 572, 592 which can transmit and receive signals, respectively, to and from other devices, subsystems and/or other destinations using the one or more antennas 504 and/or links/busses. Included in the subsystem 450 circuitry is the medium access control or MAC Circuitry 522. MAC circuitry 522 provides for controlling access to the wireless medium. In an exemplary embodiment, the MAC circuitry 522 may be arranged to contend for the wireless medium and configure frames or packets for communicating over the wired/wireless medium.

The subsystem 450 can also optionally contain a security module (not shown). This security module can contain information regarding but not limited to, security parameters required to connect the device to one or more other devices or other available network(s), and can include WEP or WPA/WPA-2 (optionally+AES and/or TKIP) security access keys, network keys, etc. The WEP security access key is a security password used by Wi-Fi networks. Knowledge of this code can enable a wireless device to exchange information with an access point and/or another device. The information exchange can occur through encoded messages with the WEP access code often being chosen by the network administrator. WPA is an added security standard that is also used in conjunction with network connectivity with stronger encryption than WEP.

In some embodiments, the communications subsystem 450 also includes a GPU 540, an accelerator 544, a Wi-Fi/BT/BLE (Bluetooth® Low-Energy) PHY module 580 and a Wi-Fi/BT/BLE MAC module 584 and optional wireless transmitter 588 and optional wireless receiver 592. In some embodiments, the GPU 540 may be a graphics processing unit, or visual processing unit, comprising at least one circuit and/or chip that manipulates and changes memory to accelerate the creation of images in a frame buffer for output to at least one display device. The GPU 540 may include one or more of a display device connection port, printed circuit board (PCB), a GPU chip, a metal-oxide-semiconductor field-effect transistor (MOSFET), memory (e.g., single data rate random-access memory (SDRAM), double data rate random-access memory (DDR) RAM, etc., and/or combinations thereof), a secondary processing chip (e.g., handling video out capabilities, processing, and/or other functions in addition to the GPU chip, etc.), a capacitor, heatsink, temperature control or cooling fan, motherboard connection, shielding, and the like.

The various connectivity managers 534, 558, 562, 566 manage and/or coordinate communications between the subsystem 450 and one or more of the systems disclosed herein and one or more other devices/systems. The connectivity managers 534, 558, 562, 566 include a charging connectivity manager 534, a vehicle database connectivity manager 558, a remote operating system connectivity manager 562, and a sensor connectivity manager 566.

The charging connectivity manager 534 can coordinate not only the physical connectivity between the vehicle 100 and a charging device/vehicle, but can also communicate with one or more of a power management controller, one or more third parties and optionally a billing system(s). As an example, the vehicle 100 can establish communications with the charging device/vehicle to one or more of coordinate interconnectivity between the two (e.g., by spatially aligning the charging receptacle on the vehicle with the charger on the charging vehicle) and optionally share navigation information. Once charging is complete, the amount of charge provided can be tracked and optionally forwarded to, for example, a third party for billing. In addition to being able to manage connectivity for the exchange of power, the charging connectivity manager 534 can also communicate information, such as billing information to the charging vehicle and/or a third party. This billing information could be, for example, the owner of the vehicle, the driver/occupant(s) of the vehicle, company information, or in general any information usable to charge the appropriate entity for the power received.

The vehicle database connectivity manager 558 allows the subsystem to receive and/or share information stored in the vehicle database. This information can be shared with other vehicle components/subsystems and/or other entities, such as third parties and/or charging systems. The information can also be shared with one or more vehicle occupant devices, such as an app (application) on a mobile device the driver uses to track information about the vehicle 100 and/or a dealer or service/maintenance provider. In general, any information stored in the vehicle database can optionally be shared with any one or more other devices optionally subject to any privacy or confidentially restrictions.

The remote operating system connectivity manager 562 facilitates communications between the vehicle 100 and any one or more autonomous vehicle systems. These communications can include one or more of navigation information, vehicle information, other vehicle information, weather information, occupant information, or in general any information related to the remote operation of the vehicle 100.

The sensor connectivity manager 566 facilitates communications between any one or more of the vehicle sensors (e.g., the driving vehicle sensors and systems 304, etc.) and any one or more of the other vehicle systems. The sensor connectivity manager 566 can also facilitate communications between any one or more of the sensors and/or vehicle systems and any other destination, such as a service company, app, or in general to any destination where sensor data is needed.

In accordance with one exemplary embodiment, any of the communications discussed herein can be communicated via the conductor(s) used for charging. One exemplary protocol usable for these communications is Power-line communication (PLC). PLC is a communication protocol that uses electrical wiring to simultaneously carry both data, and Alternating Current (AC) electric power transmission or electric power distribution. It is also known as power-line carrier, power-line digital subscriber line (PDSL), mains communication, power-line telecommunications, or power-line networking (PLN). For DC environments in vehicles PLC can be used in conjunction with CAN bus, LIN-bus over power line (DC-LIN) and DC-BUS.

The communications subsystem can also optionally manage one or more identifiers, such as an IP (Internet Protocol) address(es), associated with the vehicle and one or other system or subsystems or components and/or devices therein. These identifiers can be used in conjunction with any one or more of the connectivity managers as discussed herein.

Figure 6:
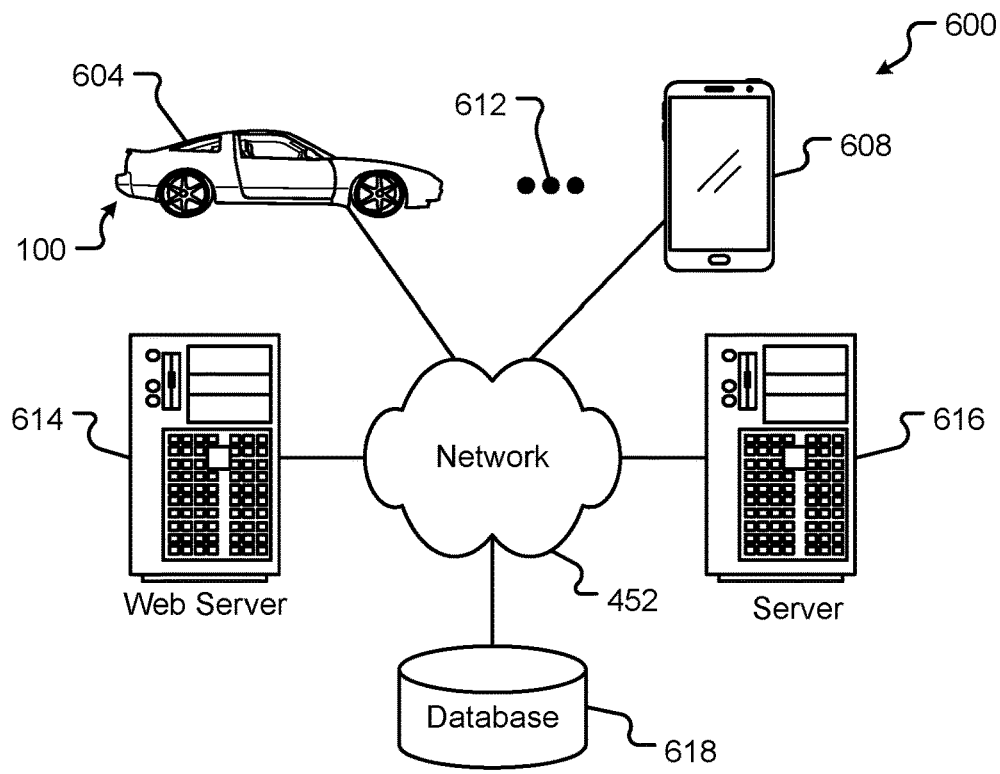
FIG. 6 is a block diagram illustrating an example of a computing environment of the vehicle in accordance with aspects of the present disclosure

FIG. 6 illustrates a block diagram of a computing environment 600 that may function as the servers, user computers, or other systems provided and described herein. The computing environment 600 includes one or more user computers, or computing devices, such as a vehicle computing device 604, a communication device 608, and/or more 612. The computing devices 604, 608, 612 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 604, 608, 612 may also have any of a variety of applications, including for example, database client and/or server applications, and web browser applications. Alternatively, the computing devices 604, 608, 612 may be any other electronic device, such as a thin-client computer, Internet-enabled mobile telephone, and/or personal digital assistant, capable of communicating via a network 452 and/or displaying and navigating web pages or other types of electronic documents or information. Although the exemplary computing environment 600 is shown with two computing devices, any number of user computers or computing devices may be supported.

The computing environment 600 may also include one or more servers 614, 616. In this example, server 614 is shown as a web server and server 616 is shown as an application server. The web server 614, which may be used to process requests for web pages or other electronic documents from computing devices 604, 608, 612. The web server 614 can be running an operating system including any of those discussed above, as well as any commercially-available server operating systems. The web server 614 can also run a variety of server applications, including SIP (Session Initiation Protocol) servers, HTTP(s) servers, FTP servers, CGI servers, database servers, Java® servers, and the like. In some instances, the web server 614 may publish operations available operations as one or more web services.

The computing environment 600 may also include one or more file and or/application servers 616, which can, in addition to an operating system, include one or more applications accessible by a client running on one or more of the computing devices 604, 608, 612. The server(s) 616 and/or 614 may be one or more general purpose computers capable of executing programs or scripts in response to the computing devices 604, 608, 612. As one example, the server 616, 614 may execute one or more web applications. The web application may be implemented as one or more scripts or programs written in any programming language, such as Java®, C, C#®, or C++, and/or any scripting language, such as Perl, Python, or TCL, as well as combinations of any programming/scripting languages. The application server(s) 616 may also include database servers, including without limitation those commercially available from Oracle®, Microsoft®, Sybase®, IBM® and the like, which can process requests from database clients running on a computing device 604, 608, 612.

The web pages created by the server 614 and/or 616 may be forwarded to a computing device 604, 608, 612 via a web (file) server 614, 616. Similarly, the web server 614 may be able to receive web page requests, web services invocations, and/or input data from a computing device 604, 608, 612 (e.g., a user computer, etc.) and can forward the web page requests and/or input data to the web (application) server 616. In further embodiments, the server 616 may function as a file server. Although for ease of description, FIG. 6 illustrates a separate web server 614 and file/application server 616, those skilled in the art will recognize that the functions described with respect to servers 614, 616 may be performed by a single server and/or a plurality of specialized servers, depending on implementation-specific needs and parameters. The computer systems 604, 608, 612, web (file) server 614 and/or web (application) server 616 may function as the system, devices, or components described in FIGS. 1-6.

The computing environment 600 may also include a database 618. The database 618 may reside in a variety of locations. By way of example, database 618 may reside on a storage medium local to (and/or resident in) one or more of the computers 604, 608, 612, 614, 616. Alternatively, it may be remote from any or all of the computers 604, 608, 612, 614, 616, and in communication (e.g., via the network 452) with one or more of these. The database 618 may reside in a storage-area network ("SAN") familiar to those skilled in the art. Similarly, any necessary files for performing the functions attributed to the computers 604, 608, 612, 614, 616 may be stored locally on the respective computer and/or remotely, as appropriate. The database 618 may be a relational database, such as Oracle 20i®, that is adapted to store, update, and retrieve data in response to SQL-formatted commands.

Figure 7:
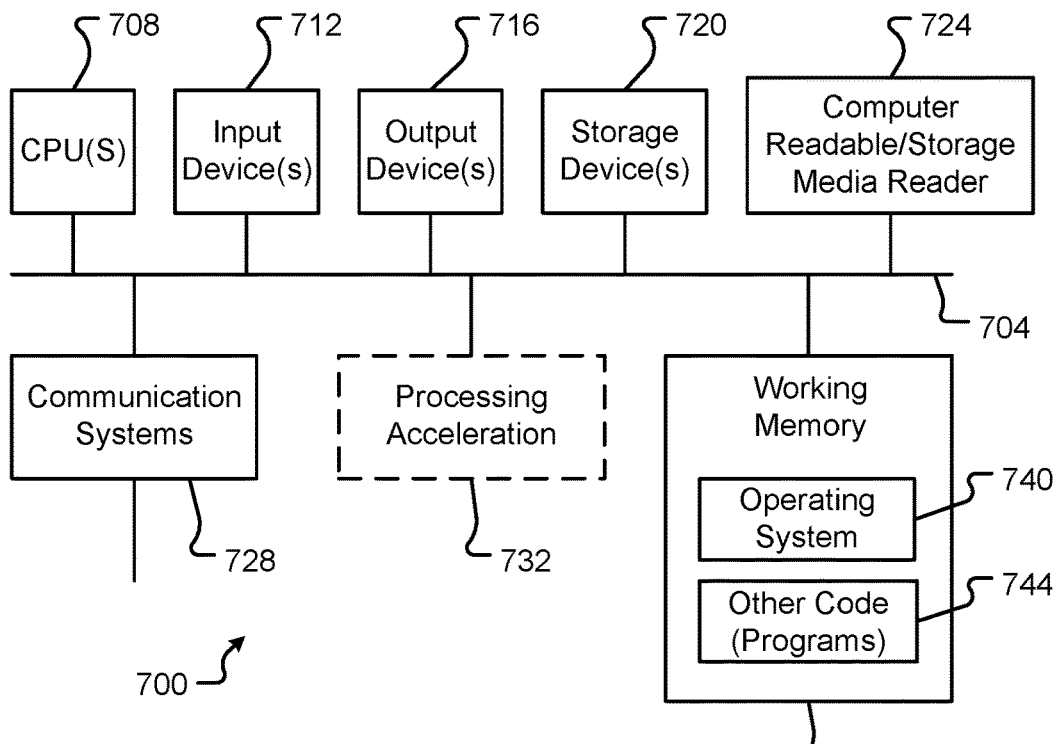
FIG. 7 is a block diagram illustrates an example of a computing device associated with one or more components described herein.

FIG. 7 illustrates one embodiment of a computer system 700 upon which the servers, user computers, computing devices, or other systems or components described above may be deployed or executed. The computer system 700 is shown comprising hardware elements that may be electrically coupled via a bus 704. The hardware elements may include one or more central processing units (CPUs) 708; one or more input devices 712 (e.g., a mouse, a keyboard, etc.); and one or more output devices 716 (e.g., a display device, a printer, etc.). The computer system 700 may also include one or more storage devices 720. By way of example, storage device(s) 720 may be disk drives, optical storage devices, solid-state storage devices such as a random access memory ("RAM") and/or a read-only memory ("ROM"), which can be programmable, flash-updateable and/or the like.

The computer system 700 may additionally include a computer-readable storage media reader 724; a communications system 728 (e.g., a modem, a network card (wireless or wired), an infra-red communication device, etc.); and working memory 736, which may include RAM and ROM devices as described above. The computer system 700 may also include a processing acceleration unit 732, which can include a DSP, a special-purpose processor, and/or the like.

The computer-readable storage media reader 724 can further be connected to a computer-readable storage medium, together (and, optionally, in combination with storage device(s) 720) comprehensively representing remote, local, fixed, and/or removable storage devices plus storage media for temporarily and/or more permanently containing computer-readable information. The communications system 728 may permit data to be exchanged with a network and/or any other computer described above with respect to the computer environments described herein. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 700 may also comprise software elements, shown as being currently located within a working memory 736, including an operating system 740 and/or other code 744. It should be appreciated that alternate embodiments of a computer system 700 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 340, 708 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8450 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJS™ processors, other industry-equivalent processors, and may perform computational functions using any known or future-developed standard, instruction set, libraries, and/or architecture.

Any of the steps, functions, and operations discussed herein can be performed continuously and automatically.

The exemplary systems and methods of this disclosure have been described in relation to a PDU router 104 and a vehicle system 101. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Example aspects of the present disclosure include an apparatus including: a processor; and memory in electronic communication with the processor; and instructions stored in the memory, the instructions being executable by the processor to: receive a diagnostic response; identify a diagnostic request corresponding to the diagnostic response, based on a comparison of a first PDU identifier associated with the diagnostic request and a second PDU identifier associated with the diagnostic response; and route the diagnostic response to a diagnostic client associated with the diagnostic request.

Aspects of the above apparatus include where the instructions are further executable by the processor to: identify a routing path between the diagnostic target and the diagnostic client based on the first PDU identifier and the second PDU identifier, where the routing path is associated with the diagnostic request, where routing the diagnostic response to the diagnostic client may include transmitting the diagnostic response to the diagnostic client based on the routing path.

Aspects of the above apparatus include where the routing path overlaps at least a portion of a second routing path between the diagnostic target and a second diagnostic client.

Aspects of the above apparatus include where the routing path may include a set of electrical interconnections between the diagnostic target and the diagnostic client; the second routing path may include a second set of electrical interconnections between the diagnostic target and the second diagnostic client; and the set of electrical interconnections at least partially overlaps the second set of electrical interconnections.

Aspects of the above apparatus include where the instructions are further executable by the processor to: generate a set of PDU identifiers, the set of PDU identifiers including the first PDU identifier and the second PDU identifier, where: each PDU identifier of the set of PDU identifiers corresponds to a previous diagnostic request of a set of previous diagnostic requests and a candidate diagnostic client of a set of candidate diagnostic clients; the set of previous diagnostic requests may include the diagnostic request; and the set of candidate diagnostic clients may include the diagnostic client.

Aspects of the above apparatus include where each PDU identifier is associated with a routing path between a diagnostic target and a diagnostic client of the set of candidate diagnostic clients.

Aspects of the above apparatus include where the instructions are further executable by the processor to: receive the diagnostic request from the diagnostic client; and route the diagnostic request to a diagnostic target, where the diagnostic request may include a request for the diagnostic response, where the diagnostic response is generated at the diagnostic target based on the diagnostic request.

Aspects of the above apparatus include where the instructions are further executable by the processor to: receive the diagnostic request from the diagnostic client; and route the diagnostic request to a diagnostic target, where the diagnostic request is a latest diagnostic request among a set of previous diagnostic requests.

Aspects of the above apparatus include where the diagnostic client may include at least one of: a first client device coupled to the diagnostic target via a first communications bus; a second client device coupled to the diagnostic target via a second communications bus, where the first communications bus and the second communications bus are of a first communication protocol type; a third client device coupled to the diagnostic target via a third communications bus, where the third communications bus is of a second communication protocol type; and a fourth client device coupled to the diagnostic target via a fourth communications bus and a relay device, where the fourth communications bus and the relay device are of the first communication protocol type.

Aspects of the above apparatus include where the first communication protocol type may include a CAN protocol; and the second communication protocol type may include a DoIP.

Aspects of the above apparatus include where the diagnostic target may include at least one of: a diagnostic server; CAN ECU; a LIN ECU; and a local UDS server.

Example aspects of the present disclosure include a system including: a communications bus; a processor; and memory in electronic communication with the processor; and instructions stored in the memory, the instructions being executable by the processor to: receive a diagnostic response; identify a diagnostic request corresponding to the diagnostic response, based on a comparison of a first PDU identifier associated with the diagnostic request and a second PDU identifier associated with the diagnostic response; and route the diagnostic response to a diagnostic client associated with the diagnostic request.

Aspects of the above system include where the instructions are further executable by the processor to: identify a routing path between the diagnostic target and the diagnostic client based on the first PDU identifier and the second PDU identifier, where the routing path is associated with the diagnostic request, where routing the diagnostic response to the diagnostic client may include transmitting the diagnostic response to the diagnostic client based on the routing path.

Aspects of the above system include where the routing path overlaps at least a portion of a second routing path between the diagnostic target and a second diagnostic client.

Aspects of the above system include where the routing path may include a set of electrical interconnections between the diagnostic target and the diagnostic client; the second routing path may include a second set of electrical interconnections between the diagnostic target and the second diagnostic client; and the set of electrical interconnections at least partially overlaps the second set of electrical interconnections.

Aspects of the above system include where the instructions are further executable by the processor to: generate a set of PDU identifiers, the set of PDU identifiers including the first PDU identifier and the second PDU identifier, where: each PDU identifier of the set of PDU identifiers corresponds to a previous diagnostic request of a set of previous diagnostic requests and a candidate diagnostic client of a set of candidate diagnostic clients; the set of previous diagnostic requests may include the diagnostic request; and the set of candidate diagnostic clients may include the diagnostic client.

Aspects of the above system include where each PDU identifier is associated with a routing path between a diagnostic target and a diagnostic client of the set of candidate diagnostic clients.

Example aspects of the present disclosure include a method including: receiving, at a PDU routing engine, a diagnostic response; identifying, by the PDU routing engine, a diagnostic request corresponding to the diagnostic response, based on a comparison of a first PDU identifier associated with the diagnostic request and a second PDU identifier associated with the diagnostic response; and routing, by the PDU routing engine, the diagnostic response to a diagnostic client associated with the diagnostic request.

Aspects of the above method include: identifying a routing path between the diagnostic target and the diagnostic client based on the first PDU identifier and the second PDU identifier, where the routing path is associated with the diagnostic request, where routing the diagnostic response to the diagnostic client may include transmitting the diagnostic response to the diagnostic client based on the routing path.

Aspects of the above method include where the routing path overlaps at least a portion of a second routing path between the diagnostic target and a second diagnostic client.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

What is claimed is:

1. An apparatus comprising:
   a processor; and
   a memory in electronic communication with the processor; and
   instructions stored in the memory, the instructions being executable by the processor to:
   receive a diagnostic response;
   identify a diagnostic request corresponding to the diagnostic response, based at least in part on a comparison of a first protocol data unit (PDU) identifier associated with the diagnostic request and a second PDU identifier associated with the diagnostic response; and
   route the diagnostic response to a diagnostic client associated with the diagnostic request.

2. The apparatus of claim 1, wherein the instructions are further executable by the processor to:
   identify a routing path between a diagnostic target and the diagnostic client based at least in part on the first PDU identifier and the second PDU identifier, wherein the routing path is associated with the diagnostic request,
   wherein routing the diagnostic response to the diagnostic client comprises transmitting the diagnostic response to the diagnostic client based at least in part on the routing path.

3. The apparatus of claim 2, wherein the routing path overlaps at least a portion of a second routing path between the diagnostic target and a second diagnostic client.

4. The apparatus of claim 3, wherein:
   the routing path comprises a set of electrical interconnections between the diagnostic target and the diagnostic client;
   the second routing path comprises a second set of electrical interconnections between the diagnostic target and the second diagnostic client; and
   the set of electrical interconnections at least partially overlaps the second set of electrical interconnections.

5. The apparatus of claim 1, wherein the instructions are further executable by the processor to:

generate a set of PDU identifiers, the set of PDU identifiers comprising the first PDU identifier and the second PDU identifier, wherein:
each PDU identifier of the set of PDU identifiers corresponds to a previous diagnostic request of a set of previous diagnostic requests and a candidate diagnostic client of a set of candidate diagnostic clients;
the set of previous diagnostic requests comprise the diagnostic request; and
the set of candidate diagnostic clients comprise the diagnostic client.

6. The apparatus of claim 5, wherein each PDU identifier is associated with a routing path between a diagnostic target and a diagnostic client of the set of candidate diagnostic clients.

7. The apparatus of claim 1, wherein the instructions are further executable by the processor to:
receive the diagnostic request from the diagnostic client; and
route the diagnostic request to a diagnostic target, wherein the diagnostic request comprises a request for the diagnostic response,
wherein the diagnostic response is generated at the diagnostic target based at least in part on the diagnostic request.

8. The apparatus of claim 1, wherein the instructions are further executable by the processor to:
receive the diagnostic request from the diagnostic client; and
route the diagnostic request to a diagnostic target, wherein the diagnostic request is a latest diagnostic request among a set of previous diagnostic requests.

9. The apparatus of claim 1, wherein the diagnostic client comprises at least one of:
a first client device coupled to a diagnostic target via a first communications bus;
a second client device coupled to the diagnostic target via a second communications bus, wherein the first communications bus and the second communications bus are of a first communication protocol type;
a third client device coupled to the diagnostic target via a third communications bus, wherein the third communications bus is of a second communication protocol type; and
a fourth client device coupled to the diagnostic target via a fourth communications bus and a relay device, wherein the fourth communications bus and the relay device are of the first communication protocol type.

10. The apparatus of claim 9, wherein:
the first communication protocol type comprises a CAN protocol; and
the second communication protocol type comprises a diagnostics over internet protocol (DoIP).

11. The apparatus of claim 1, wherein a diagnostic target comprises at least one of:
a diagnostic server;
a CAN electronic control unit (ECU);
a local interconnect network (LIN) ECU; and
a local unified diagnostic services (UDS) server.

12. A system comprising:
a communications bus;
a processor; and
memory in electronic communication with the processor; and
instructions stored in the memory, the instructions being executable by the processor to:
receive a diagnostic response;
identify a diagnostic request corresponding to the diagnostic response, based at least in part on a comparison of a first protocol data unit (PDU) identifier associated with the diagnostic request and a second PDU identifier associated with the diagnostic response; and
route the diagnostic response to a diagnostic client associated with the diagnostic request.

13. The system of claim 12, wherein the instructions are further executable by the processor to:
identify a routing path between a diagnostic target and the diagnostic client based at least in part on the first PDU identifier and the second PDU identifier, wherein the routing path is associated with the diagnostic request,
wherein routing the diagnostic response to the diagnostic client comprises transmitting the diagnostic response to the diagnostic client based at least in part on the routing path.

14. The system of claim 13, wherein the routing path overlaps at least a portion of a second routing path between the diagnostic target and a second diagnostic client.

15. The system of claim 14, wherein:
the routing path comprises a set of electrical interconnections between the diagnostic target and the diagnostic client;
the second routing path comprises a second set of electrical interconnections between the diagnostic target and the second diagnostic client; and
the set of electrical interconnections at least partially overlaps the second set of electrical interconnections.

16. The system of claim 12, wherein the instructions are further executable by the processor to:
generate a set of PDU identifiers, the set of PDU identifiers comprising the first PDU identifier and the second PDU identifier, wherein:
each PDU identifier of the set of PDU identifiers corresponds to a previous diagnostic request of a set of previous diagnostic requests and a candidate diagnostic client of a set of candidate diagnostic clients;
the set of previous diagnostic requests comprise the diagnostic request; and
the set of candidate diagnostic clients comprise the diagnostic client.

17. The system of claim 16, wherein each PDU identifier is associated with a routing path between a diagnostic target and a diagnostic client of the set of candidate diagnostic clients.

18. A method comprising:
receiving, at a protocol data unit (PDU) routing engine, a diagnostic response;
identifying, by the PDU routing engine, a diagnostic request corresponding to the diagnostic response, based at least in part on a comparison of a first PDU identifier associated with the diagnostic request and a second PDU identifier associated with the diagnostic response; and
routing, by the PDU routing engine, the diagnostic response to a diagnostic client associated with the diagnostic request.

19. The method of claim 18, further comprising:
identifying a routing path between a diagnostic target and the diagnostic client based at least in part on the first PDU identifier and the second PDU identifier, wherein the routing path is associated with the diagnostic request, wherein routing the diagnostic response to the diagnostic client comprises transmitting the diagnostic response to the diagnostic client based at least in part on the routing path.

20. The method of claim 19, wherein the routing path overlaps at least a portion of a second routing path between the diagnostic target and a second diagnostic client.

* * * * *